United States Patent
Yerramalli et al.

(10) Patent No.: US 10,701,717 B2
(45) Date of Patent: Jun. 30, 2020

(54) COEXISTENCE OF AUTONOMOUS AND GRANT BASED UPLINK TRANSMISSIONS

(71) Applicant: QUALCOMM Incorporated, San Diego, CA (US)

(72) Inventors: Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/991,591

(22) Filed: May 29, 2018

(65) Prior Publication Data

US 2019/0014589 A1 Jan. 10, 2019

Related U.S. Application Data

(60) Provisional application No. 62/528,644, filed on Jul. 5, 2017.

(51) Int. Cl.
*H04W 72/12* (2009.01)
*G06F 1/329* (2019.01)
(Continued)

(52) U.S. Cl.
CPC ........ *H04W 72/1247* (2013.01); *G06F 1/329* (2013.01); *H04L 5/001* (2013.01);
(Continued)

(58) Field of Classification Search
CPC ........... H04W 72/1247; H04W 52/346; H04W 52/365; H04W 52/0216; H04W 52/0264;
(Continued)

(56) References Cited

U.S. PATENT DOCUMENTS

2004/0228313 A1* 11/2004 Cheng .................. H04L 1/1887
370/342
2015/0271847 A1* 9/2015 Luo ..................... H04W 74/002
370/329

FOREIGN PATENT DOCUMENTS

WO    WO-2016163683 A1    10/2016

OTHER PUBLICATIONS

CATT: "CBG-based UL HARQ Transmission," 3GPP Draft; R1-1707515, 3rd Generation Partnership Project (3GPP), Mobile Competence Centre; 650, Route Des Lucioles; F-06921, Sophia-Antipolis Cedex; France, vol. RAN WG1, No. Hangzhou; 20170515-20170519, May 14, 2017, XP051272723, 2 pages, Retrieved from the Internet: URL: http://www.3gpp.org/ftp/Meetings_3GPP_SYNC/RAN1/Docs/ [retrieved on May 15, 2017].
(Continued)

*Primary Examiner* — Dady Chery
(74) *Attorney, Agent, or Firm* — Qualcomm IP Dept.; James Hunt Yancey, Jr.

(57) ABSTRACT

Methods, systems, and devices for wireless communication are described. A wireless device may schedule an autonomous uplink (UL) transmission and a scheduled UL transmission during the same time period. The wireless device may determine that it is operating in a limited power state and therefore cannot transmit both the autonomous UL transmission and the scheduled UL transmission. The wireless device may prioritize one of the autonomous UL transmission and the scheduled UL transmission based at least in part on a priority configuration. The wireless device may receive the priority configuration from a base station (e.g., in radio resource control signaling).

25 Claims, 17 Drawing Sheets

(51) Int. Cl.
H04L 5/00 (2006.01)
H04W 52/02 (2009.01)
H04W 52/34 (2009.01)
H04W 52/36 (2009.01)
H04W 72/04 (2009.01)

(52) U.S. Cl.
CPC .......... H04L 5/0012 (2013.01); H04L 5/0064 (2013.01); H04W 52/0216 (2013.01); H04W 52/0264 (2013.01); H04W 52/346 (2013.01); H04W 52/365 (2013.01); H04W 72/0473 (2013.01); H04W 72/1278 (2013.01)

(58) Field of Classification Search
CPC .......... H04W 72/1278; H04W 72/0473; H04L 5/0064; H04L 5/001; H04L 5/0012; G06F 1/329
See application file for complete search history.

(56) References Cited

OTHER PUBLICATIONS

Ericsson: "Autonomous UL Access for LAA Unlicensed Cells," 3GPP Draft; R1-1705950, 3rd Generation Partnership Project (3GPP), Mobile Competence Centre; 650, Route Des Lucioles; F-06921 Sophia-Antipolis Cedex; France, vol. RAN WG1, No. Spokane, USA; 20170403-20170407, Mar. 24, 2017, XP051250775, 3 pages, Retrieved from the Internet: URL: http://www.3gpp.org/ftp/tsg_ran/WG1_RL1/TSGR1_88b/Docs/ [retrieved on Mar. 24, 2017].
Ericsson: "On Autonomous UL Transmissions for NR in Unlicensed Spectrum," 3GPP Draft; R1-1708956, 3rd Generation Partnership Project (3GPP), Mobile Competence Centre; 650, Route Des Lucioles; F-06921 Sophia-Antipolis Cedex; France, vol. RAN WG1, No. Hangzhou; 20170515-20170519, May 5, 2017, XP051261465, 3 pages, Retrieved from the Internet: URL: http://www.3gpp.org/ftp/tsg_ran/WG1_RL1/TSGR1_89/Docs/ [retrieved on May 5, 2017].
International Search Report and Written Opinion—PCT/US2018/035120—ISA/EPO—dated Oct. 30, 2018 (174855WO).
LG Electronics Inc: "PHR Aspect for Supporting UL LAA", 3GPP Draft; R2-165664 PHR Aspect for Supporting UL LAA, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; 20160822-20160826, Aug. 13, 2016 (Aug. 13, 2016), 2 Pages, XP051142848, Retrieved from the Internet: URL: http://www.3gpp.org/ftp/tsg_ran/WG2_RL2/TSGR2_95/Docs/ [retrieved on Aug. 13, 2016].
Partial International Search Report—PCT/US2018/035120—ISA/EPO—dated Aug. 23, 2018 (174855WO).
Qualcomm Incorporated: "Discussion on PHR Reporting for Triggered UL Grants in LAA", 3GPP Draft; R1-1611569 Discussion on PHR Reporting for Triggered UL Grants in LAA, 3rd Generation Partnership Project (3GPP), Mobile Competence Centre; 650, Route Des Lucioles; F-06921 Sophia-Antipolis, vol. RAN WG1, No. Reno, USA; 20161114-20161128, Nov. 5, 2016 (Nov. 5, 2016), pp. 1-2, XP051189977, Retrieved from the Internet: URL: http://www.3gpp.org/ftp/tsg_ran/WG1_RL1/TSGR1 87/Docs/ [retrieved on Nov. 5, 2016].
ZTE: "TPC and PHR for UL LAA", 3GPP Draft; R1-164576—TPC and PHR for UL LAA, 3rd Generation Partnership Project (3GPP), Mobile Competence Centre; 650, Route Des Lucioles; F-06921 Sophia-Antipolis Cedex; France, vol. RAN WG1, No. Nanjing, China; 20160523-20160527, May 13, 2016 (May 13, 2016), pp. 1-5, XP051096893, Retrieved from the Internet: URL: http://www.3gpp.org/ftp/tsg_ran/WG1_RL1/TSGR1_85/Docs/ [retrieved on May 13, 2016].

* cited by examiner

COEXISTENCE OF AUTONOMOUS AND GRANT BASED UPLINK TRANSMISSIONS

CROSS REFERENCES

The present Application for Patent claims the benefit of U.S. Provisional Patent Application No. 62/528,644 by Yerramalli, et al., entitled "Coexistence of Autonomous and Grant Based Uplink Transmissions," filed Jul. 5, 2017, assigned to the assignee hereof, and expressly incorporated herein.

BACKGROUND

The following relates generally to wireless communication, and more specifically to coexistence of autonomous (e.g., grantless) and grant based uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, a wireless medium may be divided into a number of channels, with each channel covering a separate, non-overlapping frequency range. Some of the channels may be in a licensed frequency band, while other channels may be in an unlicensed or shared licensed frequency band. One or more wireless devices (e.g., UEs) may transmit simultaneously (i.e., during the same time period) on different channels, thereby increasing the number of messages that may be sent at the same time.

SUMMARY

The described techniques relate to improved methods, systems, devices, or apparatuses that support coexistence of autonomous (e.g., grantless) and grant based uplink (UL) transmissions. A wireless device may schedule a first scheduled transmission and a second autonomous transmission during a subframe on different channels. The wireless device may then determine that it does not have sufficient power to transmit both the first scheduled transmission and the second autonomous transmission during the subframe. The wireless device may select one of the two transmissions based at least in part on priority information. For example, the priority information may indicate that the wireless device should prioritize the first scheduled transmission. The wireless device may transmit the first scheduled transmission, and may drop or reschedule the second autonomous transmission for another subframe.

A method of wireless communication is described. The method may include determining that the UE is operating in a limited power state, identifying an autonomous UL transmission to transmit on a first component carrier (CC) in a shared radio frequency (RF) spectrum band during a time period, identifying a scheduled UL transmission to transmit on a second CC in a second RF spectrum band during the time period, identifying a priority configuration used to prioritize between autonomous UL transmissions and scheduled UL transmissions for the limited power state, and transmitting, to a base station, the autonomous UL transmission or the scheduled UL transmission based at least in part on the identified priority configuration.

An apparatus for wireless communication is described. The apparatus may include means for determining that the UE is operating in a limited power state, means for identifying an UL transmission to transmit on a first CC in a shared RF spectrum band during a time period, means for identifying a scheduled UL transmission to transmit on a second CC in a second RF spectrum band during the time period, means for identifying a priority configuration used to prioritize between autonomous UL transmissions and scheduled UL transmissions for the limited power state, and means for transmitting, to a base station, the autonomous UL transmission or the scheduled UL transmission based at least in part on the identified priority configuration.

Another apparatus for wireless communication is described. The apparatus may include a processor, memory in electronic communication with the processor, and instructions stored in the memory. The instructions may be operable to cause the processor to determine that the UE is operating in a limited power state, identify an autonomous UL transmission to transmit on a first CC in a shared RF spectrum band during a time period, identify a scheduled UL transmission to transmit on a second CC in a second RF spectrum band during the time period, identify a priority configuration used to prioritize between autonomous UL transmissions and scheduled UL transmissions for the limited power state, and transmit, to a base station, the autonomous UL transmission or the scheduled UL transmission based at least in part on the identified priority configuration.

A non-transitory computer readable medium for wireless communication is described. The non-transitory computer-readable medium may include instructions operable to cause a processor to determine that the UE is operating in a limited power state, identify an autonomous UL transmission to transmit on a first CC in a shared RF spectrum band during a time period, identify a scheduled UL transmission to transmit on a second CC in a second RF spectrum band during the time period, identify a priority configuration used to prioritize between autonomous UL transmissions and scheduled UL transmissions for the limited power state, and transmit, to a base station, the autonomous UL transmission or the scheduled UL transmission based at least in part on the identified priority configuration.

In some examples of the method, apparatus, and non-transitory computer-readable medium described above, the second RF spectrum band may be a scheduled RF spectrum band.

In some examples of the method, apparatus, and non-transitory computer-readable medium described above, the second RF spectrum band may be a shared RF spectrum band, or a licensed RF spectrum band, or an unlicensed RF spectrum band, or a combination thereof.

In some examples of the method, apparatus, and non-transitory computer-readable medium described above, the priority configuration prioritizes the scheduled UL transmission over the autonomous UL transmission.

In some examples of the method, apparatus, and non-transitory computer-readable medium described above, the priority configuration prioritizes the autonomous UL transmission over the scheduled UL transmission.

In some examples of the method, apparatus, and non-transitory computer-readable medium described above, identifying the priority configuration comprises receiving the priority configuration from a base station.

In some examples of the method, apparatus, and non-transitory computer-readable medium described above, identifying the priority configuration comprises identifying the priority configuration from a configuration stored at the UE.

Some examples of the method, apparatus, and non-transitory computer-readable medium described above may further include processes, features, means, or instructions for determining to forego transmitting the other one of the autonomous UL transmission or the scheduled UL transmission during the time period based at least in part on the identified priority configuration.

Some examples of the method, apparatus, and non-transitory computer-readable medium described above may further include processes, features, means, or instructions for dropping the other one of the autonomous UL transmission or the scheduled UL transmission based at least in part on the identified priority configuration.

Some examples of the method, apparatus, and non-transitory computer-readable medium described above may further include processes, features, means, or instructions for receiving a radio resource control (RRC) message from a base station, the RRC message indicating the priority configuration used to prioritize between the autonomous UL transmissions and the scheduled UL transmissions.

In some examples of the method, apparatus, and non-transitory computer-readable medium described above, the time period comprises a subframe, or a slot, or a mini-slot, or a symbol, or a combination thereof.

In some examples of the method, apparatus, and non-transitory computer-readable medium described above, the limited power state comprises a reduced power mode.

In some examples of the method, apparatus, and non-transitory computer-readable medium described above, determining that the UE may be operating in the limited power state comprises determining that an operating power level of the UE would exceed a power threshold for the UE.

A method of wireless communication is described. The method may include identifying a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period, transmitting, to the UE, an indication of the priority configuration, and receiving, from the UE during the time period, an autonomous UL transmission or a scheduled UL transmission based at least in part on the transmitted indication of the priority configuration.

An apparatus for wireless communication is described. The apparatus may include means for identifying a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period, means for transmitting, to the UE, an indication of the priority configuration, and means for receiving, from the UE during the time period, an autonomous UL transmission or a scheduled UL transmission based at least in part on the transmitted indication of the priority configuration.

Another apparatus for wireless communication is described. The apparatus may include a processor, memory in electronic communication with the processor, and instructions stored in the memory. The instructions may be operable to cause the processor to identify a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period, transmit, to the UE, an indication of the priority configuration, and receive, from the UE during the time period, an autonomous UL transmission or a scheduled UL transmission based at least in part on the transmitted indication of the priority configuration.

A non-transitory computer readable medium for wireless communication is described. The non-transitory computer-readable medium may include instructions operable to cause a processor to identify a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period, transmit, to the UE, an indication of the priority configuration, and receive, from the UE during the time period, an autonomous UL transmission or a scheduled UL transmission based at least in part on the transmitted indication of the priority configuration.

In some examples of the method, apparatus, and non-transitory computer-readable medium described above, the priority configuration prioritizes the autonomous UL transmissions over the scheduled UL transmissions.

In some examples of the method, apparatus, and non-transitory computer-readable medium described above, the priority configuration prioritizes the scheduled UL transmissions over the autonomous UL transmissions.

In some examples of the method, apparatus, and non-transitory computer-readable medium described above, transmitting the indication of the priority configuration comprises transmitting a RRC message to the UE, the RRC message indicating the priority configuration.

A method of wireless communication is described. The method may include identifying an autonomous UL transmission to transmit on a first CC in a shared RF spectrum band during a time period and transmitting, in a power headroom report on a second CC in a second RF spectrum band during the time period, an indication of whether the UE will attempt to transmit the autonomous UL transmission.

An apparatus for wireless communication is described. The apparatus may include means for identifying an autonomous UL transmission to transmit on a first CC in a shared RF spectrum band during a time period and means for transmitting, in a power headroom report on a second CC in a second RF spectrum band during the time period, an indication of whether the UE will attempt to transmit the autonomous UL transmission.

Another apparatus for wireless communication is described. The apparatus may include a processor, memory in electronic communication with the processor, and instructions stored in the memory. The instructions may be operable to cause the processor to identify an autonomous UL transmission to transmit on a first CC in a shared RF spectrum band during a time period and transmit, in a power headroom report on a second CC in a second RF spectrum band during the time period, an indication of whether the UE will attempt to transmit the autonomous UL transmission.

A non-transitory computer readable medium for wireless communication is described. The non-transitory computer-readable medium may include instructions operable to cause a processor to identify an autonomous UL transmission to transmit on a first CC in a shared RF spectrum band during a time period and transmit, in a power headroom report on a second CC in a second RF spectrum band during the time period, an indication of whether the UE will attempt to transmit the autonomous UL transmission.

Some examples of the method, apparatus, and non-transitory computer-readable medium described above may further include processes, features, means, or instructions for transmitting a scheduled UL transmission on the second CC in the second RF spectrum band during the time period, the scheduled UL transmission including the power headroom report.

Some examples of the method, apparatus, and non-transitory computer-readable medium described above may further include processes, features, means, or instructions for attempting to transmit the identified autonomous UL transmission on the first CC in the shared RF spectrum band during the time period.

Some examples of the method, apparatus, and non-transitory computer-readable medium described above may further include processes, features, means, or instructions for receiving, from a base station, a configuration for autonomous UL transmissions of the UE, wherein the indication of whether the UE will attempt to transmit the autonomous UL transmission may be transmitted based at least in part on the received configuration.

In some examples of the method, apparatus, and non-transitory computer-readable medium described above, receiving the configuration for the autonomous UL transmissions of the UE comprises receiving a RRC message that identifies the configuration.

In some examples of the method, apparatus, and non-transitory computer-readable medium described above, the configuration for autonomous UL transmissions comprises frequency domain resources for the UE to use to transmit autonomous UL transmissions to the base station.

In some examples of the method, apparatus, and non-transitory computer-readable medium described above, the time period comprises a subframe, or a slot, or a mini-slot, or a symbol, or a combination thereof.

Some examples of the method, apparatus, and non-transitory computer-readable medium described above may further include processes, features, means, or instructions for receiving a scheduled UL transmission on the first CC in the second RF spectrum band during the time period, the scheduled UL transmission including the power headroom report.

A method of wireless communication is described. The method may include receiving a power headroom report from a UE on a first CC in a second RF spectrum band during a time period and identifying, based at least in part on the received power headroom report, an indication of whether the UE will attempt to transmit an autonomous UL transmission on a second CC in a shared RF spectrum band.

An apparatus for wireless communication is described. The apparatus may include means for receiving a power headroom report from a UE on a first CC in a second RF spectrum band during a time period and means for identifying, based at least in part on the received power headroom report, an indication of whether the UE will attempt to transmit an autonomous UL transmission on a second CC in a shared RF spectrum band.

Another apparatus for wireless communication is described. The apparatus may include a processor, memory in electronic communication with the processor, and instructions stored in the memory. The instructions may be operable to cause the processor to receive a power headroom report from a UE on a first CC in a second RF spectrum band during a time period and identify, based at least in part on the received power headroom report, an indication of whether the UE will attempt to transmit an autonomous UL transmission on a second CC in a shared RF spectrum band.

A non-transitory computer readable medium for wireless communication is described. The non-transitory computer-readable medium may include instructions operable to cause a processor to receive a power headroom report from a UE on a first CC in a second RF spectrum band during a time period and identify, based at least in part on the received power headroom report, an indication of whether the UE will attempt to transmit an autonomous UL transmission on a second CC in a shared RF spectrum band.

Some examples of the method, apparatus, and non-transitory computer-readable medium described above may further include processes, features, means, or instructions for receiving, during at least a portion of the time period, the autonomous UL transmission on the second CC in the shared RF spectrum band.

In some examples of the method, apparatus, and non-transitory computer-readable medium described above, the power headroom report from the UE may be received as at least a part of the received autonomous UL transmission.

Some examples of the method, apparatus, and non-transitory computer-readable medium described above may further include processes, features, means, or instructions for transmitting, to the UE, a configuration for autonomous UL transmissions of the UE, wherein the autonomous UL transmission may be received based at least in part on the transmitted configuration.

In some examples of the method, apparatus, and non-transitory computer-readable medium described above, transmitting the configuration for autonomous UL transmissions comprises transmitting a RRC message that identifies the configuration or a default configuration for the power headroom report.

In some examples of the method, apparatus, and non-transitory computer-readable medium described above, the configuration for autonomous UL transmissions comprises frequency domain resources for the UE to use to transmit autonomous UL transmissions to the base station.

In some examples of the method, apparatus, and non-transitory computer-readable medium described above, the time period comprises a subframe, or a slot, or a mini-slot, or a symbol, or a combination thereof.

DETAILED DESCRIPTION

In some wireless communications systems, a base station may provide scheduling information to user equipment (UEs). The UEs may use the scheduling information to determine when they may transmit on an uplink (UL) channel to the base station. The base station may also indicate periods of time during which the UEs may transmit autonomously. The UEs may then transmit autonomous transmissions during these periods of time.

In some examples, the base station may identify different access for different channels. For example, the base station may indicate that a first channel is reserved for scheduled transmissions during a first time period, and may indicate that a second channel is available for autonomous transmissions during a second time period.

In some cases, a UE may have a scheduled transmission and an autonomous transmission scheduled for the same time period, and may transmit both the scheduled transmission and the autonomous transmission on different channels. However, the UE may have limited power resources. For example, the UE may not have sufficient power to transmit both the scheduled transmission and the autonomous transmission at a power level necessary for the transmission to be successfully received at their destinations.

In such power limited scenarios, the UE may utilize priority information to determine how to proceed. For example, the UE may always prioritize the scheduled transmission over the autonomous transmissions. In other examples, the UE may receive priority information from the base station, and prioritize the scheduled transmission or the autonomous transmission based on the priority information. In some examples, the UE may indicate in a power headroom report whether it will attempt to transmit both the scheduled transmission and the autonomous transmission during the same time period.

Aspects of the disclosure are initially described in the context of a wireless communications system. Aspects of the disclosure are further illustrated by and described with reference to apparatus diagrams, system diagrams, and flowcharts that relate to coexistence of autonomous (e.g., grantless) and grant based uplink transmissions (e.g., in multi-carrier licensed assisted access).

Figure 1:
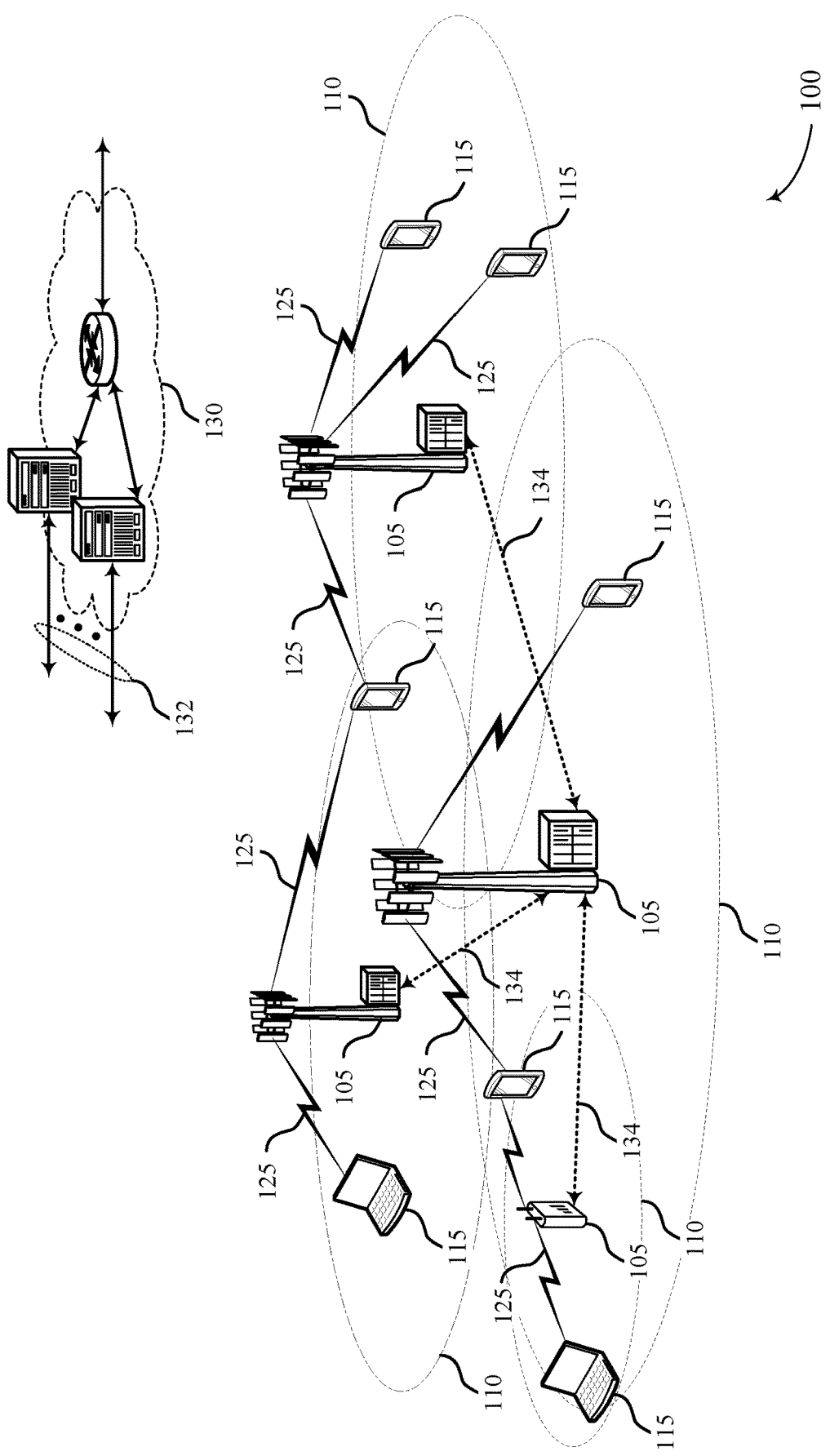
FIG. 1 illustrates an example of a system for wireless communication that supports coexistence of autonomous and grant based uplink transmissions in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving mode (e.g., a "deep sleep" mode) when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s = 1/30,720,000$ seconds). Time resources may be organized according to radio frames of length of 10 ms ($T_f = 307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, the LBT procedures for multi-carrier transmissions, such as the grantless UL (GUL) transmissions described, may be similar to or the same as multi-carrier LBT procedures for UEs that use LAA. In some examples, one or more of the LBT modes may be used for grantless UL. In some case grantless UL transmissions may follow Wi-Fi channel bonding rules, for example if operating in the 5 GHz radio frequency spectrum band. In the example of multi-carrier grantless UL transmissions, different contention windows may be used for different CCs, and the contention windows may be updated separately or independently of other contention windows.

Base station 105 and UEs 115 may support coexistence of grantless and grant based uplink transmissions. A wireless device, for example a base station 105 (or, e.g., a UE 115) may identify a priority configuration for a UE 115 (or base station 105, etc.), the priority configuration for the UE 115 to use to prioritize between autonomous UL transmissions and scheduled UL transmissions while the UE 115 operates in a limited power state. In some cases, the autonomous UL transmissions are to be transmitted on a first CC in a shared RF spectrum band, and scheduled UL transmissions are to be transmitted on a second CC in a second RF spectrum band (e.g., a shared, license, or unlicensed RF spectrum band) during the same time period as the autonomous UL transmissions. The base station 105 (or, UE 115) may then transmit the priority configuration (e.g., including priority information) to the UE 115. The UE 115 may schedule a first scheduled transmission and a second autonomous transmission during a subframe on different channels. The UE 115 may then determine that it does not have sufficient power to transmit both the first scheduled transmission and the second autonomous transmission during the subframe. The UE 115 may select one of the two transmissions based at least in part on priority information. For example, the priority information may indicate that the UE 115 (or base station 105) should prioritize the first scheduled transmission. UE 115 (or base station 105) may transmit the first scheduled transmission, and may drop or reschedule the second autonomous transmission for another subframe.

UE 115 may also identify an autonomous UL transmission to transmit on a first CC in a shared RF spectrum band during a time period. UE 115 may then transmit to base station 105 in a power headroom report on a second CC in a second RF spectrum band (e.g., a shared, license, or unlicensed RF spectrum band), for example during the same time period, an indication of whether the UE 115 will attempt to transmit the autonomous UL transmission during the time period. The base station 105 may identify based on the power headroom report whether the UE will attempt the transmission.

Figure 2:
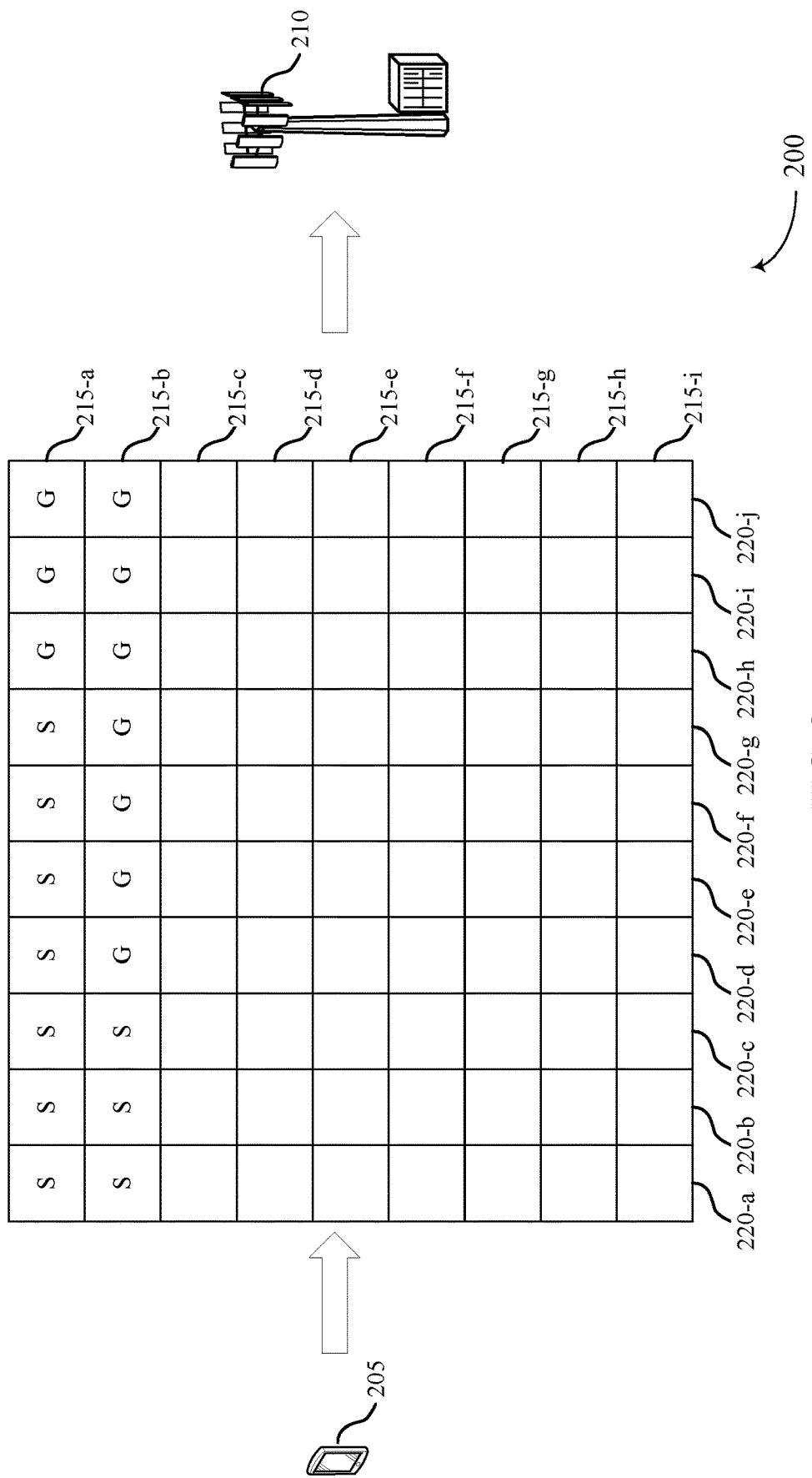
FIG. 2 illustrates an example of a wireless communications system that supports coexistence of autonomous and grant based uplink transmissions in accordance with aspects of the present disclosure.

FIG. 2 illustrates an example of a wireless communications system 200 that supports coexistence of autonomous and grant based uplink transmissions in accordance with various aspects of the present disclosure. In some examples, wireless communications system 200 may implement aspects of wireless communications system 100.

The wireless communications system 200 may include a UE 205 and a base station 210. The UE 205 and base station 210 may be examples of aspects of UE 115 and base station 105 as described with reference to FIG. 1.

The uplink communications path between the UE 205 and the base station 210 may include a number of channels (or component carriers) 215, with each channel 215 covering a different, non-overlapping frequency band. Each channel 215 may be divided into a number of subframes. For example, each channel 215 may be time divided into subframes 220. In other examples, channels 215 may be divided into different, or additional, types of time periods or durations other than subframes. For example, a channel 215 may be divided into subframes, slots, mini-slots, or symbols, or some combination of one or more of subframes, slots, mini-slots, and symbols.

The base station 210 may transmit one or more grantless uplink configuration messages to the UE 205 in RRC signaling to configure the uplink (UL) channels 215. For example, the configuration information may identify a set of subframes in which grantless uplink transmissions may be transmitted. For example, the grantless UL configuration messages may indicate that subframes 220-a, 220-b, 220-c, 220-d, 220-e, 220-f, and 220-g may be used to transmit scheduled uplink (SUL) transmissions on the first channel 215-a, and may indicate that subframes 220-h, 220-i, and 220-j may be used to transmit grantless UL transmissions on the first channel 215-a.

The base station 210 may also transmit a priority indicator to the UE 205 in RRC signaling. The priority indicator may indicate whether the UE 205 should prioritize grantless UL transmissions or scheduled UL transmissions when the UE 205 has scheduled both types of transmissions during a subframe.

In some examples, the base station 210 may transmit one configuration for all channels, such that the configuration for the first channel 215-a may be used for all channels 215. In some other examples, the base station 210 may transmit two or more configurations. For example, the grantless UL configuration messages may indicate that subframes 220-a, 220-b, and 220-c may be used to transmit scheduled UL transmissions on the second channel 215-b, and may indicate that subframes 220-d, 220-e, 220-f, 220-g, 220-h, 220-i, and 220-j may be used to transmit grantless UL transmissions on the second channel 215-b. The UE 205 may configure its grantless UL transmissions based at least in part on the one or more grantless UL configuration messages. In some examples, the configurations for and the transmission of grantless UL and/or scheduled UL may be for different types of time periods or durations other than or in addition to subframes. For example, the UE 205 may configure transmissions on one or more of channels 215 based on subframes, slots, mini-slots, or symbols, or some combination of one or more of subframes, slots, mini-slots, and symbols.

The UE 205 may transmit one or more grantless UL transmissions in a subframe. Prior to transmitting a grantless UL transmission, the UE 205 may perform a listen before talk (LBT) procedure. For example, the UE 205 may schedule a grantless UL transmission during subframe 220-f on the second channel 215-b. The UE 205 may perform a LBT procedure on the second channel 215-b during (e.g., at the start of) subframe 220-f. Upon successful completion of the LBT procedure, the UE 205 may transmit the grantless UL transmission.

The UE 205 may perform a separate LBT procedure on each channel on which the UE 205 desires to transmit during a subframe. For example, if the UE 205 has grantless UL transmissions scheduled on the second channel 215-b and a third channel 215-c during the second subframe, the UE 205 may perform a first LBT procedure on the second channel 215-b and a second LBT procedure on the third channel 215-c. For example, when the LBT procedure involves the use of a contention window, a separate contention window may be used for each channel.

In some examples, the UE 205 may schedule a grantless UL transmission and a scheduled UL transmission during the same subframe (or slot, mini-slot, symbol, etc.). For example, the UE 205 may schedule a scheduled UL transmission on the first channel 215-a during subframe 220-f, and may schedule a grantless UL transmission on the second channel 215-b during subframe 220-f. The UE 205 may transmit both scheduled UL transmissions and grantless UL transmissions during the same subframe. In some examples, the UE 205 may not have sufficient power capacity to transmit both the scheduled UL transmissions and the grantless UL transmissions. In some examples, the UE 205 may prioritize the scheduled UL transmission by dropping the grantless UL transmission. In some examples, the UE 205 may prioritize either the grantless UL transmission or the scheduled UL transmission based at least in part on a priority indicator provided by the base station 210.

In some examples, the UE 205 may transmit a power headroom report to the base station 210. For example, the UE 205 may transmit a power headroom report periodically, or may transmit a power headroom report based at least in part on a change in the power (e.g., a path loss change greater than a threshold). The power headroom report may include an indication of whether the UE 205 will or will not attempt a grantless UL transmission in the subframe in which the power headroom report is transmitted.

Figure 3:
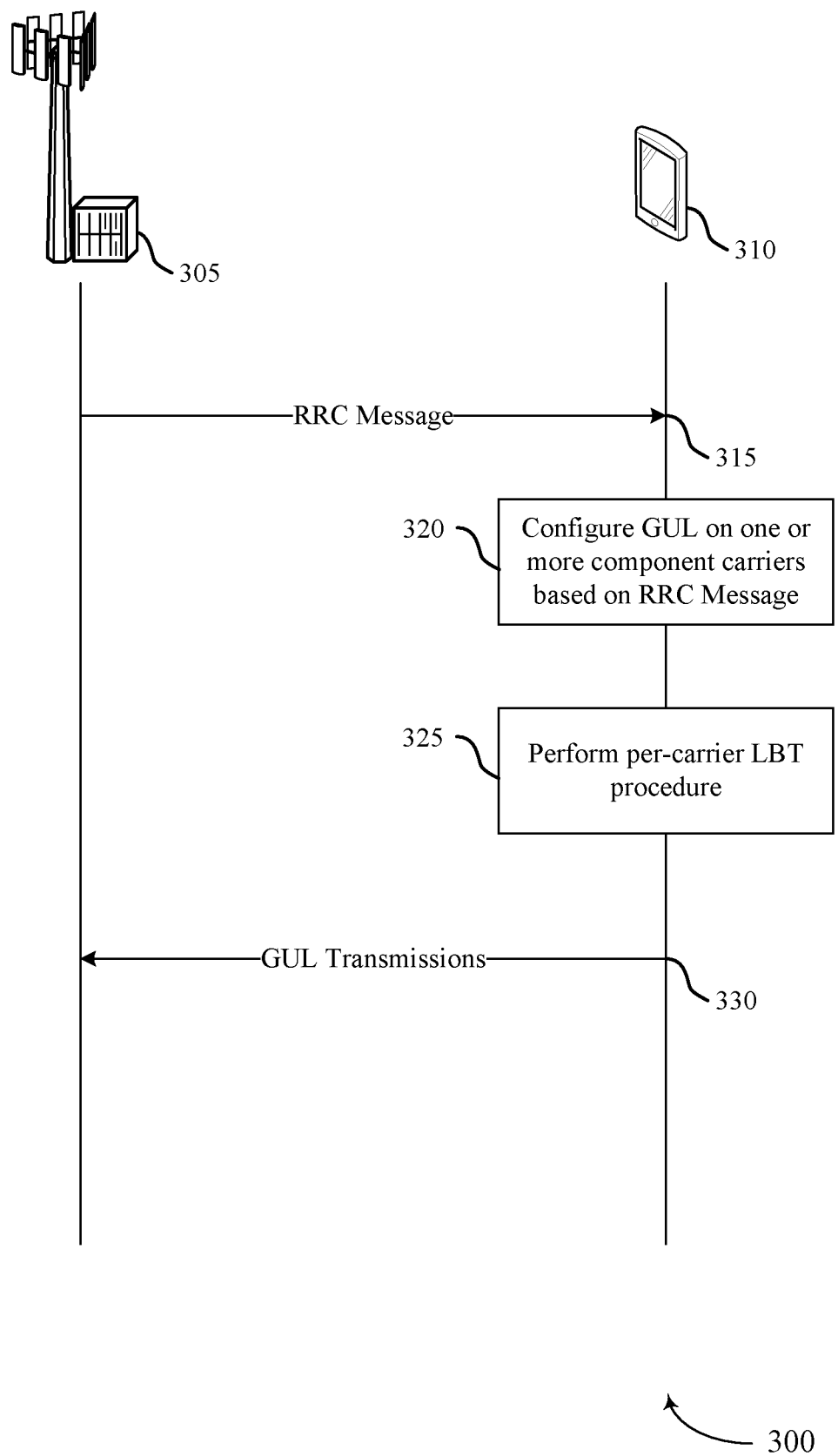
FIG. 3 illustrates an example of a flow diagram for communications in a wireless communications system that supports coexistence of autonomous and grant based uplink transmissions in accordance with aspects of the present disclosure.

FIG. 3 illustrates an example of a flow diagram 300 for communications in a wireless communications system that supports coexistence of autonomous and grant based uplink transmissions in accordance with various aspects of the present disclosure. In some examples, the wireless communications system may implement aspects of wireless communications system 100.

Flow diagram 300 shows communications between a base station 305 and a UE 310. The base station 305 may be an example of aspects of base station 105 described with reference to FIG. 1. The UE 310 may be an example of aspects of UE 115 described with reference to FIG. 1.

The base station 305 may transmit one or more grantless (autonomous) UL configuration messages such as RRC message 315 to the UE 310. The RRC message may include configuration information for the component carriers. The configuration information may identify subframes in which grantless uplink transmissions may be transmitted (e.g., a set of subframes for grantless UL transmission). The configuration information may also identify subframes in which scheduled uplink transmissions may be transmitted.

In some examples, the RRC message 315 may identify configuration information for each component carrier. In some other examples, the RRC message 315 may identify configuration information for groups of component carriers. In some other examples, the RRC message 315 may identify configuration information applicable to all component carriers.

In some examples, the RRC message 315 may identify one or more subframes in which grantless uplink transmissions may be transmitted. In other examples, the RRC message 315 may identify at least one component carrier on which no grantless uplink transmissions may be transmitted.

The RRC message 315 may include a priority indicator. The priority indicator may indicate whether grantless UL transmissions or scheduled UL transmission should be prioritized when both types of transmissions are scheduled for transmission within the same subframe. In some examples, the priority indicator may be or include a metric for determining whether grantless UL transmissions or scheduled UL transmission should be prioritized.

In some examples, the RRC message 315 may also include a scrambling identifier, a MIMO indication, a maximum number of grantless UL subframes, a partial subframe indication, an end position indication, or a combination thereof.

At 320, the UE 310 may configure grantless uplink transmissions on one or more component carriers based at least in part on the RRC message 315. The one or more component carriers may be in an unlicensed or shared licensed radio frequency spectrum band. For example, the UE 310 may determine, based at least in part on the RRC message 315, one or more subframes on one or more component carriers on which it may attempt to transmit a grantless uplink transmission.

In some examples, the UE 310 may also receive grantless downlink control information (G-DCI). G-DCI may be transmitted in a basic format or an extended format. The extended format may be, for example, a DCI Format 1C. The UE 310 may monitor the G-DCI in a common search space of the primary cell (PCell). The UE 310 may, additionally or alternatively, monitor the G-DCI in a common search space of the secondary cell (SCell).

The UE 310 may perform a listen before talk (LBT) procedure at 325. In some examples, the UE 310 may look for a cell-specific reference signal (CRS) of a subframe. If the UE 310 does not detect a CRS in the first symbol of a subframe, the UE 310 may perform the LBT procedure in the following time period. The UE 310 may not, or may be barred from, transmitting grantless uplink transmission until it has successfully performed the LBT procedure.

The LBT procedure may be performed separately for each component carrier. Thus, the UE 310 may perform a number of LBT procedures during a subframe, with each of the LBT procedures being performed on a different component carrier. In some examples, the LBT procedure may include using a contention window, and a separate contention window may be used for each component carrier.

The UE 310 may transmit the grantless UL transmissions 330 based at least in part on the LBT procedures. The UE 310 may transmit the grantless UL transmissions 330 to the base station 305. The UE 310 may transmit the grantless UL transmissions 330 on one or more component carriers in an unlicensed or shared band. The UE 310 may transmit the grantless UL transmission 330 in the subframes in which the LBT procedure is performed.

The grantless UL transmissions 330 may include a data portion. In some examples, the grantless UL transmissions 330 may include an uplink control information (UCI) portion. The UCI portion may include modulation and coding scheme (MCS) information, scrambling information, hybrid automatic repeat request (HARQ) process information, or other information to facilitate decoding of the data portion. The grantless UL transmissions 330 may be transmitted according to a probabilistic transmission parameter, a received signal strength indicator (RSSI), traffic priority, or a status of an uplink buffer.

In some examples, the base station 305 may transmit one or more acknowledgements (ACKs) or negative or not acknowledgements (NACKs or NAKs) in response to the grantless UL transmissions 330. Each ACK or NACK may be transmitted on the component carrier that carried the grantless UL transmission 330 to which the ACK or NACK is responsive.

Figure 4:
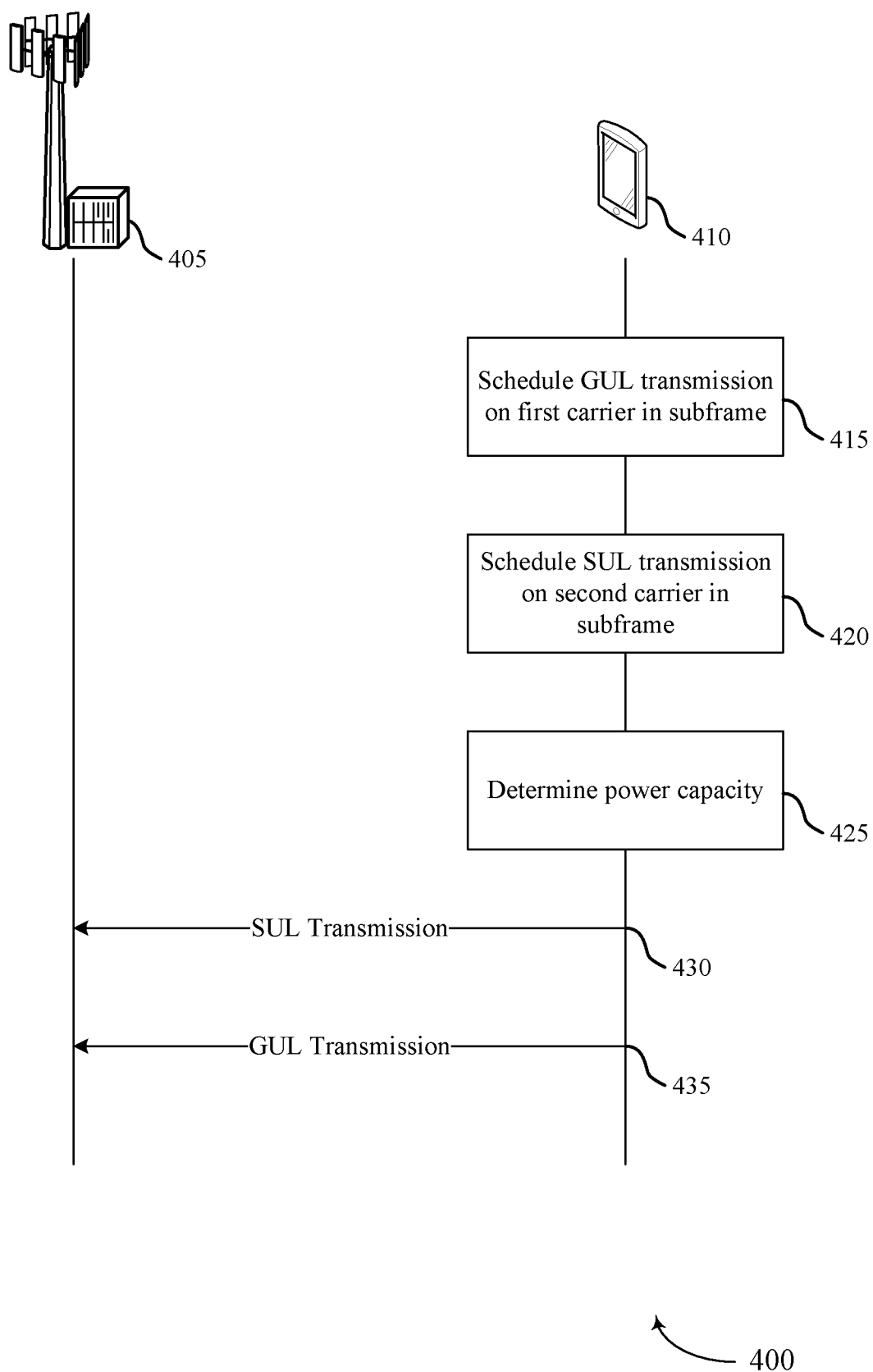
FIG. 4 illustrates an example of a flow diagram for communications in a wireless communications system that supports coexistence of autonomous and grant based uplink transmissions in accordance with aspects of the present disclosure.

FIG. 4 illustrates an example of a flow diagram 400 for communications in a wireless communications system that supports coexistence of autonomous and grant based uplink transmissions in accordance with various aspects of the present disclosure. In some examples, the wireless communications system may implement aspects of wireless communications system 100.

Flow diagram 400 shows communications between a UE 410 and a base station 405. The UE 410 may be an example of aspects of UE 115 described with reference to FIG. 1. The base station 405 may be an example of aspects of base station 105 described with reference to FIG. 1.

The UE 410 may schedule a grantless UL transmission on a first carrier in a subframe at 415. The UE 410 may schedule the grantless UL transmission based at least in part on the configuration information provided in a RRC message.

The UE 410 may schedule a scheduled UL transmission on a second carrier in the subframe at 420. The UE 410 may schedule the scheduled UL transmission based at least in part on scheduling information in downlink control information (DCI) received from base station 405. That is, base station 405 may schedule UL resources for the scheduled UL transmissions by UE 410, while the scheduling of the scheduled UL by the UE 410 is a transmission of the scheduled UL according to the scheduling information provided by base station 405.

At 425, the UE 410 may determine its power capacity for UL transmissions. In some examples, the UE 410 may determine that there is a power limited scenario, e.g., where the UE 410 cannot transmit both the grantless UL transmission and the scheduled UL transmission during the same subframe. In some examples, the UE 410 may prioritize the scheduled UL transmission over the grantless UL transmission. In some other examples, the UE 410 may prioritize the grantless UL transmission over the scheduled UL transmission. In some examples, the UE 410 may determine which type of transmission to transmit based at least in part on a priority indicator. The priority indicator may be transmitted by the base station 405 to the UE 410, for example in a RRC message as described above with reference to FIG. 3.

In some examples, the UE 410 may prioritize one transmission type (e.g., scheduled UL transmissions) over another transmission type (e.g., grantless UL transmissions) by not transmitting the other transmission type (e.g., grantless UL transmissions) during the subframe (or slot, mini-slot, or symbol). In some other examples, the UE 410 may prioritize one transmission type (e.g., scheduled UL transmissions) over another transmission type (e.g., grantless UL transmissions) by attempting to transmit the other transmission type (e.g., grantless UL transmissions) when the prioritized transmission type (e.g., scheduled UL transmissions) are not transmitted because the UE 410 was unable to reserve the medium (e.g., because the LBT procedure for the component carrier on which the scheduled UL transmissions was to be transmitted was unsuccessful).

The UE 410 may transmit the scheduled UL transmission 430 and the grantless UL transmission 435 during the subframe. In some examples, the UE 410 may transmit only the prioritized type (grantless UL or scheduled UL) and drop the type (scheduled UL or grantless UL, respectively) that is not prioritized, even when the prioritized type is expected to begin after the type that is not prioritized. For example, the priority indicator may indicate that scheduled UL transmissions may be prioritized over the grantless UL transmissions. In such an example, the grantless UL transmission 435 may not be transmitted during the subframe where there is a power limited scenario, even when the grantless UL transmission 435 is expected to begin before the scheduled UL transmission 430 in the subframe.

Figure 5:
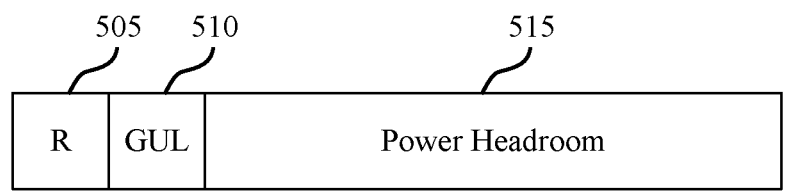
FIG. 5 illustrates an example of a power headroom report that may be used in a wireless communications system that supports coexistence of autonomous and grant based uplink transmissions in accordance with aspects of the present disclosure.

FIG. 5 illustrates an example of a power headroom report 500 that may be used in a wireless communications system that supports coexistence of autonomous and grant based uplink transmissions in accordance with various aspects of the present disclosure. In some examples, the wireless communications system may implement aspects of wireless communications system 100.

The power headroom report 500 may be or include a power headroom Medium Access Control (MAC) control element. The power headroom report 500 may include a number of fields including a reserved field 505, a GUL field 510, and a power headroom field 515. A reporting device may transmit the power headroom report 500 to a base station periodically, or aperiodically, for example in response to a change in the power (e.g., a path loss change greater than a threshold).

The power headroom field 515 may provide information about the power headroom of the reporting device. For example, the power headroom field 515 may indicate the headroom between the current transmission power of the reporting device and the nominal power of the reporting device. A base station may use the information in the power headroom field 515 to estimate how much uplink bandwidth the reporting device can use for a specific time period for example a subframe. The power headroom field 515 may indicate a range in which the power headroom falls.

The GUL field 510 may indicate when a grantless UL mode is active in a multi-carrier scenario. For example, the GUL field 510 may be a GUL flag with one bit, where a "0" indicates that the reporting device will not attempt a grantless UL transmission in the subframe in which the power headroom report 500 is transmitted, and a "1" indicates that the reporting device will attempt a grantless UL transmission in the subframe in which the power headroom report 500 is transmitted.

The reserved field 505 may be reserved for future developments, or may include other data related to the power headroom of the device.

The power headroom report 500 may be transmitted from a UE to the base station in the subframe for which the power headroom field 515 apply. The power headroom report 500 may be transmitted on a component carrier different than the component carriers on which the grantless UL transmissions are carried in the subframe.

Figure 6:
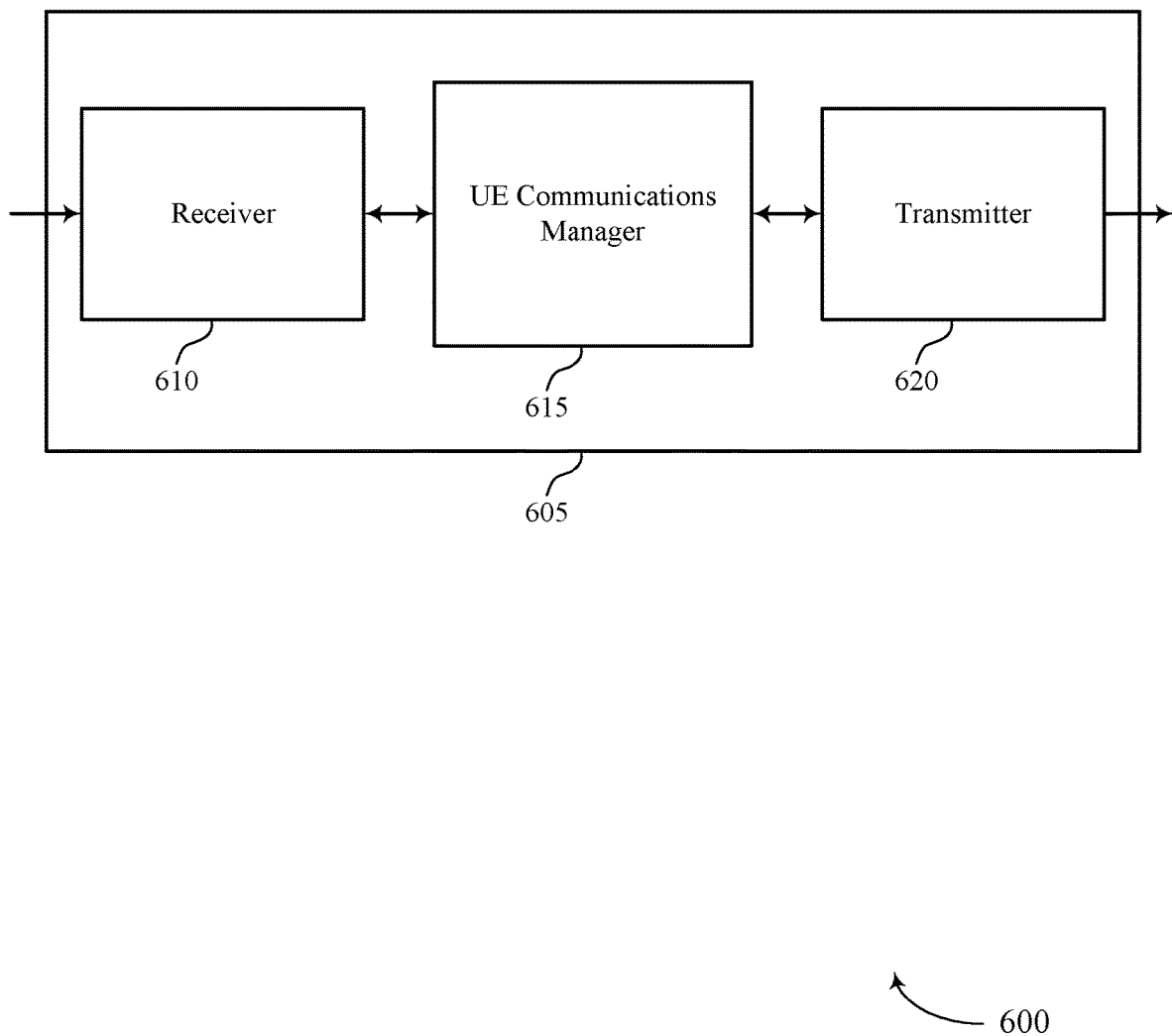
FIGS. 6 through 8 show block diagrams of a device that supports coexistence of autonomous and grant based uplink transmissions in accordance with aspects of the present disclosure.

FIG. 6 shows a block diagram 600 of a wireless device 605 that supports coexistence of autonomous and grant based uplink transmissions in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coexistence of autonomous and grant based uplink transmissions in multi-carrier licensed assisted access, etc.). Information may be passed on to other components of the device. The receiver 610 may be an example of aspects of the transceiver 935 described with reference to FIG. 9. The receiver 610 may utilize a single antenna or a set of antennas.

Receiver 610 may receive a scheduled UL transmission on the first CC in the second RF spectrum band during the time period, the scheduled UL transmission including the power headroom report.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may determine that the UE is operating in a limited power state, identify an autonomous UL transmission to transmit on a first CC in a shared radio frequency (RF) spectrum band during a time period, identify a scheduled UL transmission to transmit on a second CC in a second RF spectrum band during the time period, identify a priority configuration used to prioritize between autonomous UL transmissions and scheduled UL transmissions for the limited power state, and transmit, to a base station, the autonomous UL transmission or the scheduled UL transmission based on the identified priority configuration. The UE communications manager 615 may also identify an autonomous UL transmission to transmit on a first CC in a shared RF spectrum band during a time period and transmit, in a power headroom report on a second CC in a second RF spectrum band during the time period, an indication of whether the UE will attempt to transmit the autonomous UL transmission.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
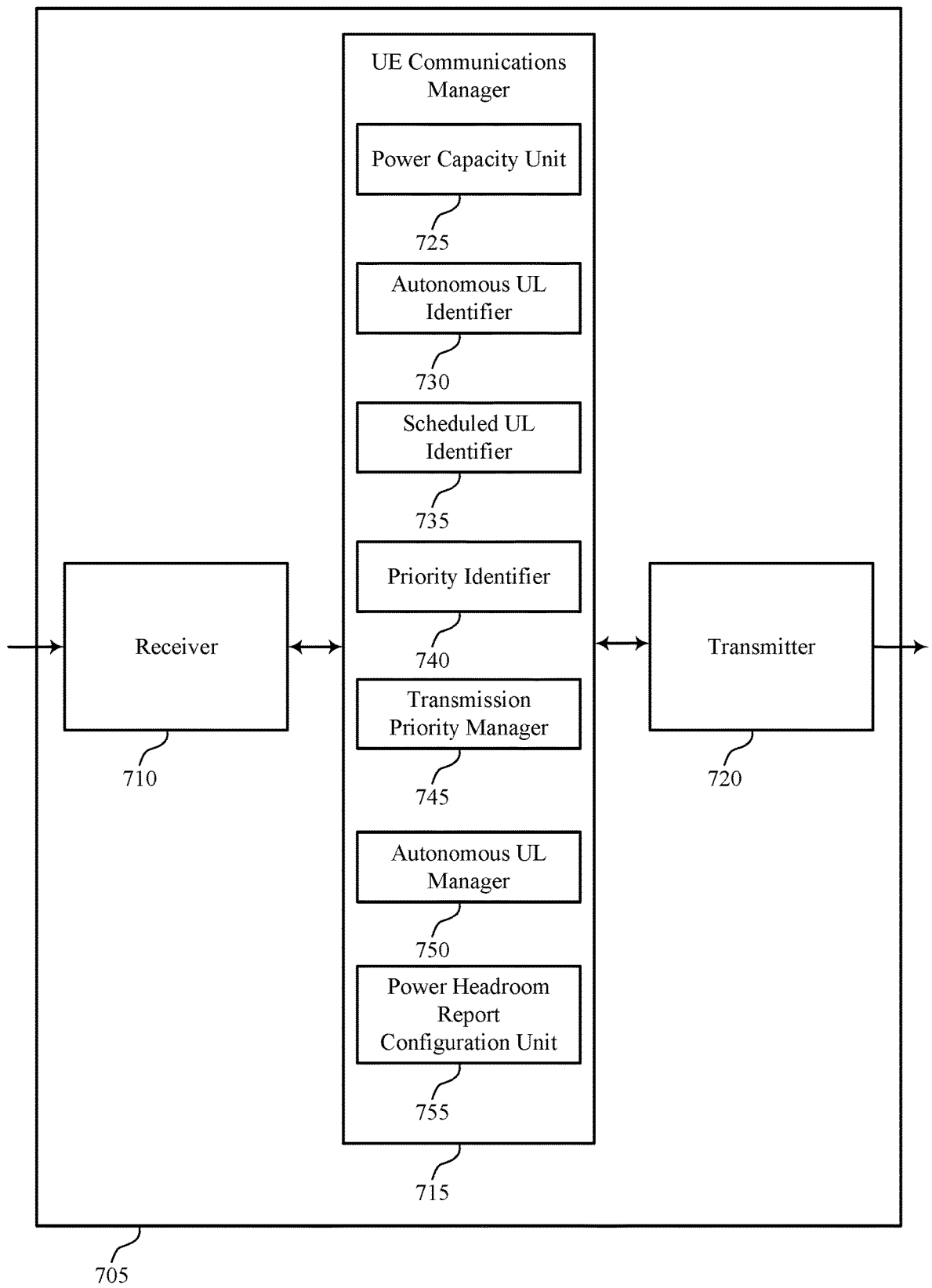

FIG. 7 shows a block diagram 700 of a wireless device 705 that supports coexistence of autonomous and grant based uplink transmissions in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to coexistence of autonomous and grant based uplink transmissions in multi-carrier licensed assisted access, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include power capacity unit 725, autonomous UL identifier 730, scheduled UL identifier 735, priority identifier 740, transmission priority manager 745, autonomous UL manager 750, and power headroom report configuration unit 755.

Power capacity unit 725 may determine that the UE is operating in a limited power state. In some cases, the limited power state includes a reduced power mode. In some cases, determining that the UE is operating in the limited power state includes: determining that an operating power level of the UE would exceed a power threshold for the UE.

Autonomous UL identifier 730 may identify an autonomous UL transmission to transmit on a first CC in a shared RF spectrum band during a time period. In some cases, the time period includes a subframe, or a slot, or a mini-slot, or a symbol, or a combination thereof.

Scheduled UL identifier 735 may identify a scheduled UL transmission to transmit on a second CC in a second RF spectrum band during the time period. In some cases, the second RF spectrum band is a scheduled RF spectrum band. In some cases, the second RF spectrum band is a shared RF spectrum band, or a licensed RF spectrum band, or an unlicensed RF spectrum band, or a combination thereof.

Priority identifier 740 may identify a priority configuration used to prioritize between autonomous UL transmissions and scheduled UL transmissions for the limited power state. In some cases, the priority configuration prioritizes the scheduled UL transmission over the autonomous UL transmission. In some cases, the priority configuration prioritizes the autonomous UL transmission over the scheduled UL transmission. In some cases, identifying the priority configuration includes: receiving the priority configuration from a base station. In some cases, identifying the priority configuration includes: identifying the priority configuration from a configuration stored at the UE.

Transmission priority manager 745 may transmit, to a base station, the autonomous UL transmission or the scheduled UL transmission based on the identified priority configuration, determine to forego transmitting the other one of the autonomous UL transmission or the scheduled UL transmission during the time period based on the identified priority configuration, and drop the other one of the autonomous UL transmission or the scheduled UL transmission based on the identified priority configuration.

Autonomous UL manager 750 may identify an autonomous UL transmission to transmit on a first CC in a shared RF spectrum band during a time period, attempt to transmit the identified autonomous UL transmission on the first CC in the shared RF spectrum band during the time period, and receive, from a base station, a configuration for autonomous UL transmissions of the UE, where the indication of whether the UE will attempt to transmit the autonomous UL transmission is transmitted based on the received configuration. In some cases, receiving the configuration for the autonomous UL transmissions of the UE includes: receiving a RRC message that identifies the configuration. In some cases, the configuration for autonomous UL transmissions includes frequency domain resources for the UE to use to transmit autonomous UL transmissions to the base station. In some cases, the time period includes a subframe, or a slot, or a mini-slot, or a symbol, or a combination thereof.

Power headroom report configuration unit 755 may transmit, in a power headroom report on a second CC in a second RF spectrum band during the time period, an indication of whether the UE will attempt to transmit the autonomous UL transmission and transmit a scheduled UL transmission on the second CC in the second RF spectrum band during the time period, the scheduled UL transmission including the power headroom report.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
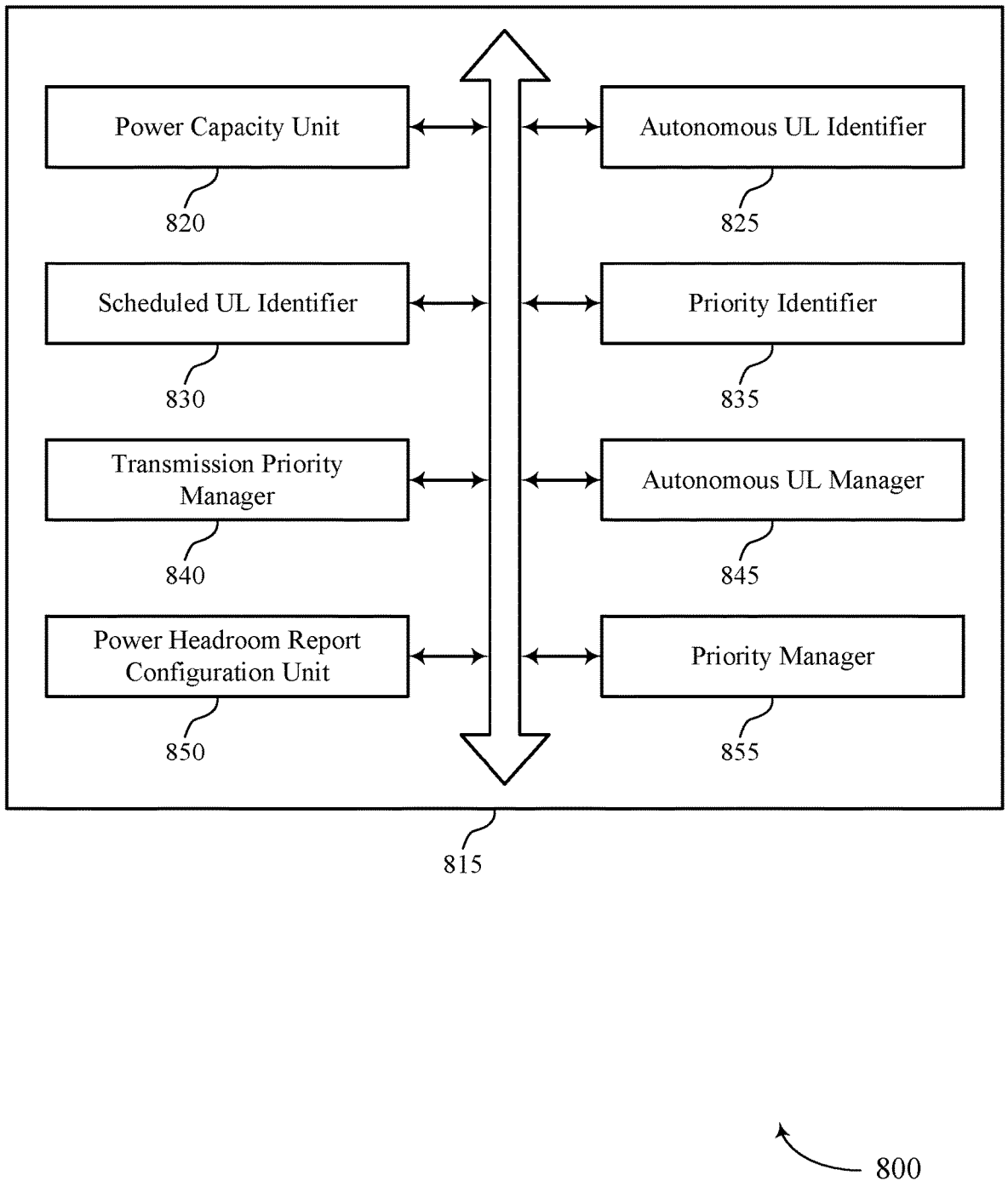

FIG. 8 shows a block diagram 800 of a UE communications manager 815 that supports coexistence of autonomous and grant based uplink transmissions in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include power capacity unit 820, autonomous UL identifier 825, scheduled UL identifier 830, priority identifier 835, transmission priority manager 840, autonomous UL manager 845, power headroom report configuration unit 850, and priority manager 855. Each of these modules may communicate, directly or indirectly, with one another (e.g., via one or more buses).

Power capacity unit 820 may determine that the UE is operating in a limited power state. In some cases, the limited power state includes a reduced power mode. In some cases, determining that the UE is operating in the limited power state includes: determining that an operating power level of the UE would exceed a power threshold for the UE.

Autonomous UL identifier 825 may identify an autonomous UL transmission to transmit on a first CC in a shared RF spectrum band during a time period. In some cases, the time period includes a subframe, or a slot, or a mini-slot, or a symbol, or a combination thereof.

Scheduled UL identifier 830 may identify a scheduled UL transmission to transmit on a second CC in a second RF spectrum band during the time period. In some cases, the second RF spectrum band is a scheduled RF spectrum band. In some cases, the second RF spectrum band is a shared RF spectrum band, or a licensed RF spectrum band, or an unlicensed RF spectrum band, or a combination thereof.

Priority identifier 835 may identify a priority configuration used to prioritize between autonomous UL transmissions and scheduled UL transmissions for the limited power state. In some cases, the priority configuration prioritizes the scheduled UL transmission over the autonomous UL transmission. In some cases, the priority configuration prioritizes the autonomous UL transmission over the scheduled UL transmission. In some cases, identifying the priority configuration includes: receiving the priority configuration from a base station. In some cases, identifying the priority configuration includes: identifying the priority configuration from a configuration stored at the UE.

Transmission priority manager 840 may transmit, to a base station, the autonomous UL transmission or the scheduled UL transmission based on the identified priority configuration, determine to forego transmitting the other one of the autonomous UL transmission or the scheduled UL transmission during the time period based on the identified priority configuration, and drop the other one of the autonomous UL transmission or the scheduled UL transmission based on the identified priority configuration.

Autonomous UL manager 845 may identify an autonomous UL transmission to transmit on a first CC in a shared RF spectrum band during a time period, attempt to transmit the identified autonomous UL transmission on the first CC in the shared RF spectrum band during the time period, and receive, from a base station, a configuration for autonomous UL transmissions of the UE, where the indication of whether the UE will attempt to transmit the autonomous UL transmission is transmitted based on the received configuration. In some cases, receiving the configuration for the autonomous UL transmissions of the UE includes: receiving a RRC message that identifies the configuration. In some cases, the configuration for autonomous UL transmissions includes frequency domain resources for the UE to use to transmit autonomous UL transmissions to the base station. In some cases, the time period includes a subframe, or a slot, or a mini-slot, or a symbol, or a combination thereof.

Power headroom report configuration unit 850 may transmit, in a power headroom report on a second CC in a second RF spectrum band during the time period, an indication of whether the UE will attempt to transmit the autonomous UL transmission and transmit a scheduled UL transmission on the second CC in the second RF spectrum band during the time period, the scheduled UL transmission including the power headroom report.

Priority manager 855 may receive a RRC message from a base station, the RRC message indicating the priority configuration used to prioritize between the autonomous UL transmissions and the scheduled UL transmissions.

Figure 9:
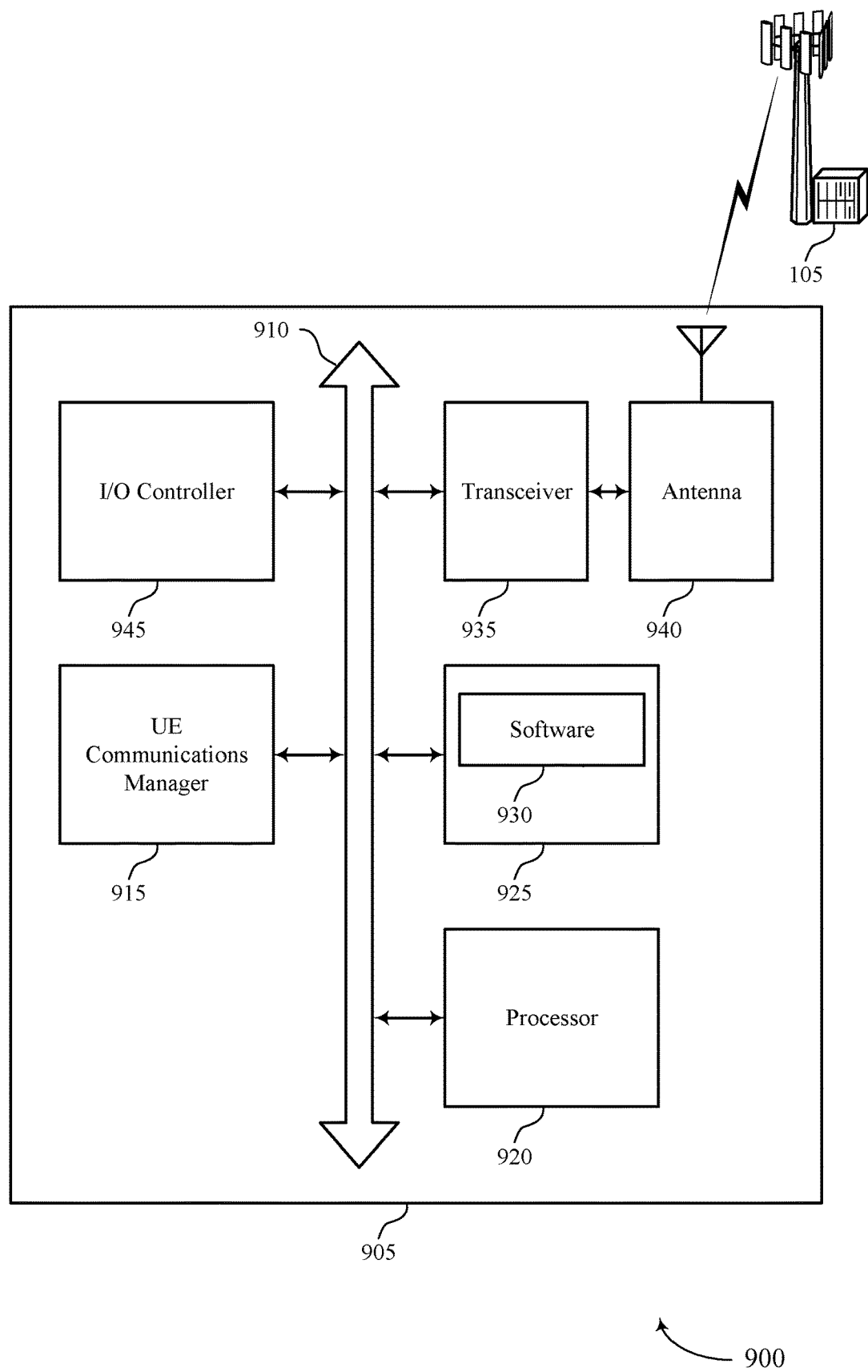
FIG. 9 illustrates a block diagram of a system including a UE that supports coexistence of autonomous and grant based uplink transmissions in accordance with aspects of the present disclosure.

FIG. 9 shows a diagram of a system 900 including a device 905 that supports coexistence of autonomous and grant based uplink transmissions in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coexistence of autonomous and grant based uplink transmissions in multi-carrier licensed assisted access).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support coexistence of autonomous and grant based uplink transmissions in multi-carrier licensed assisted access. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
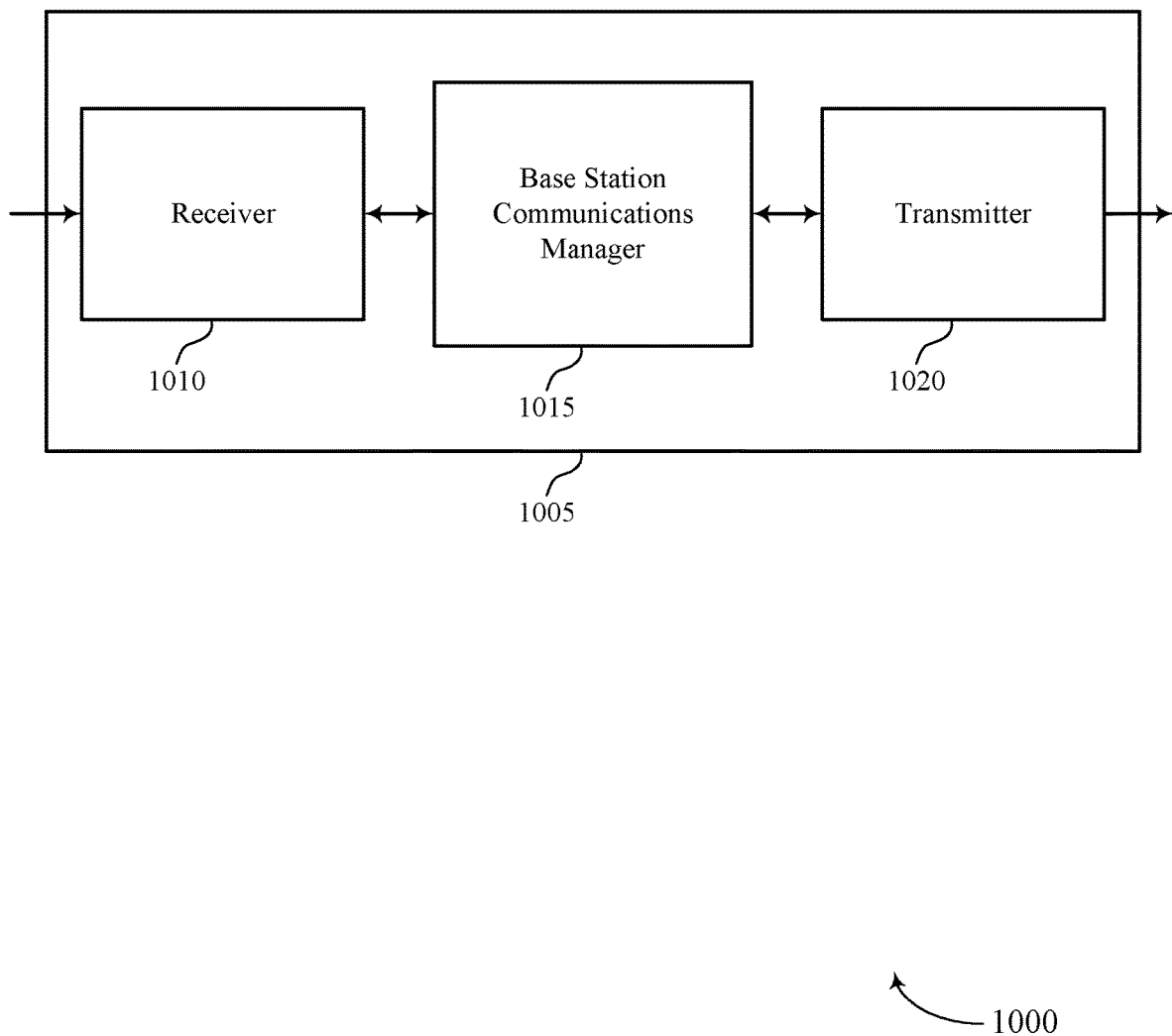
FIGS. 10 through 12 show block diagrams of a device that supports coexistence of autonomous and grant based uplink transmissions in accordance with aspects of the present disclosure.

FIG. 10 shows a block diagram 1000 of a wireless device 1005 that supports coexistence of autonomous and grant based uplink transmissions in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to coexistence of autonomous and grant based uplink transmissions in multi-carrier licensed assisted access, etc.). Information may be passed on to other components of the device. The receiver 1010 may be an example of aspects of the transceiver 1335 described with reference to FIG. 13. The receiver 1010 may utilize a single antenna or a set of antennas.

Receiver 1010 may receive, from the UE during, an autonomous UL transmission or a scheduled UL transmission based on the transmitted indication of the priority configuration and receive, during at least a portion of the time period, the autonomous UL transmission on the second CC in the shared RF spectrum band.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a priority configuration for a UE to use to prioritize between autonomous UL transmissions and scheduled UL transmissions while operating the UE in a limited power state, one or more of the autonomous UL transmissions to be transmitted on a first CC in a shared radio frequency (RF) spectrum band during a time period, and one or more of the scheduled UL transmissions to be transmitted on a second CC in a second RF spectrum band during the time period. The base station communications manager 1015 may also receive a power headroom report from a UE on a first CC in a second RF spectrum band during a time period and identify, based on the received power headroom report, an indication of whether the UE will attempt to transmit an autonomous UL transmission on a second CC in a shared RF spectrum band.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Transmitter 1020 may transmit, to the UE, an indication of the priority configuration. In some cases, transmitting the indication of the priority configuration includes: transmitting a RRC message to the UE, the RRC message indicating the priority configuration.

Figure 11:
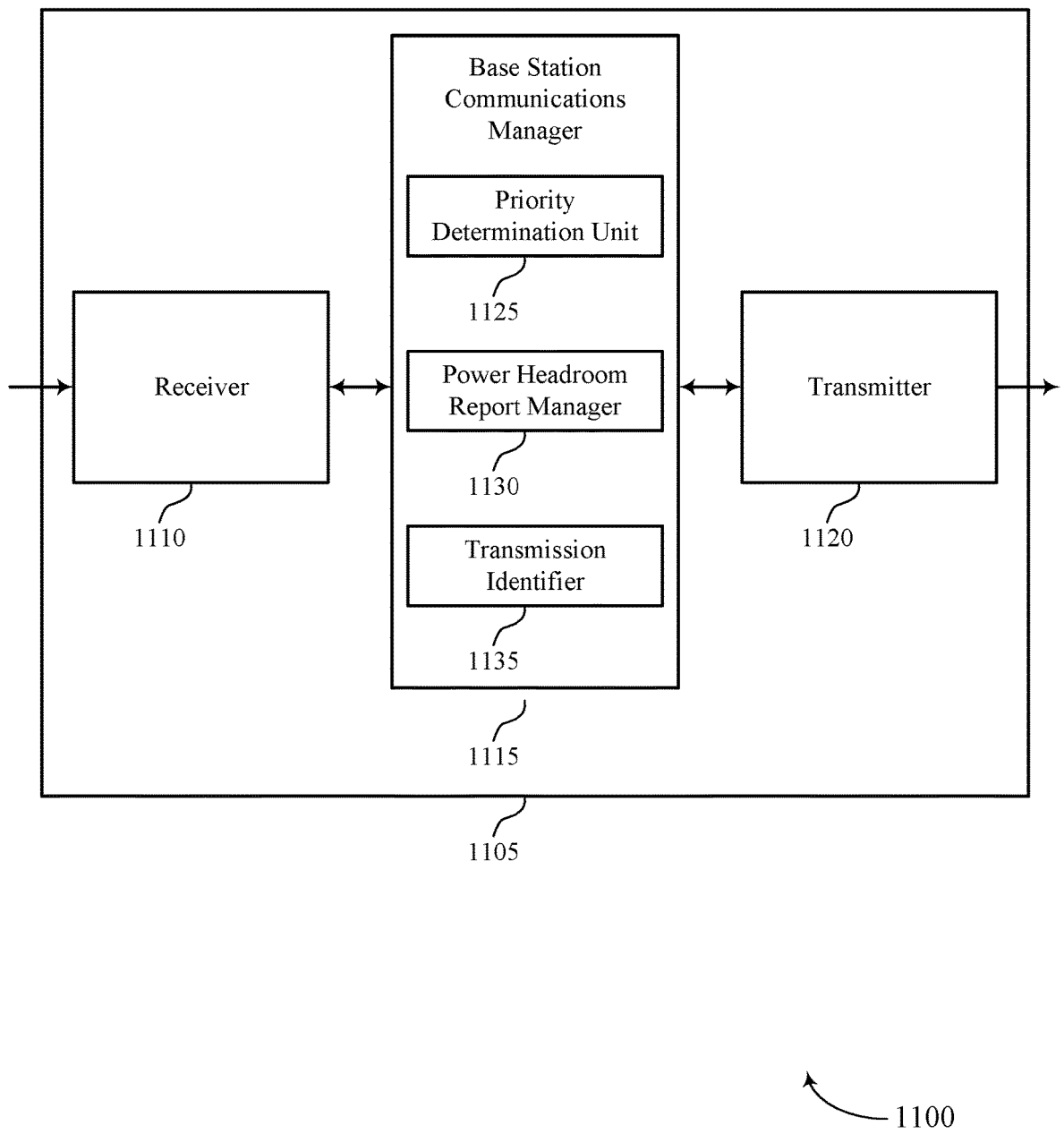

FIG. 11 shows a block diagram 1100 of a wireless device 1105 that supports coexistence of autonomous and grant based uplink transmissions in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to coexistence of autonomous and grant based uplink transmissions in multi-carrier licensed assisted access, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include priority determination unit 1125, power headroom report manager 1130, and transmission identifier 1135.

Priority determination unit 1125 may identify a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period. In some cases, the priority configuration prioritizes the autonomous UL transmissions over the scheduled UL transmissions. In some cases, the priority configuration prioritizes the scheduled UL transmissions over the autonomous UL transmissions.

Power headroom report manager 1130 may receive a power headroom report from a UE on a first CC in a second RF spectrum band during a time period. In some cases, the power headroom report from the UE is received as at least a part of the received autonomous UL transmission. In some cases, the time period includes a subframe, or a slot, or a mini-slot, or a symbol, or a combination thereof.

Transmission identifier 1135 may identify, based on the received power headroom report, an indication of whether the UE will attempt to transmit an autonomous UL transmission on a second CC in a shared RF spectrum band.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
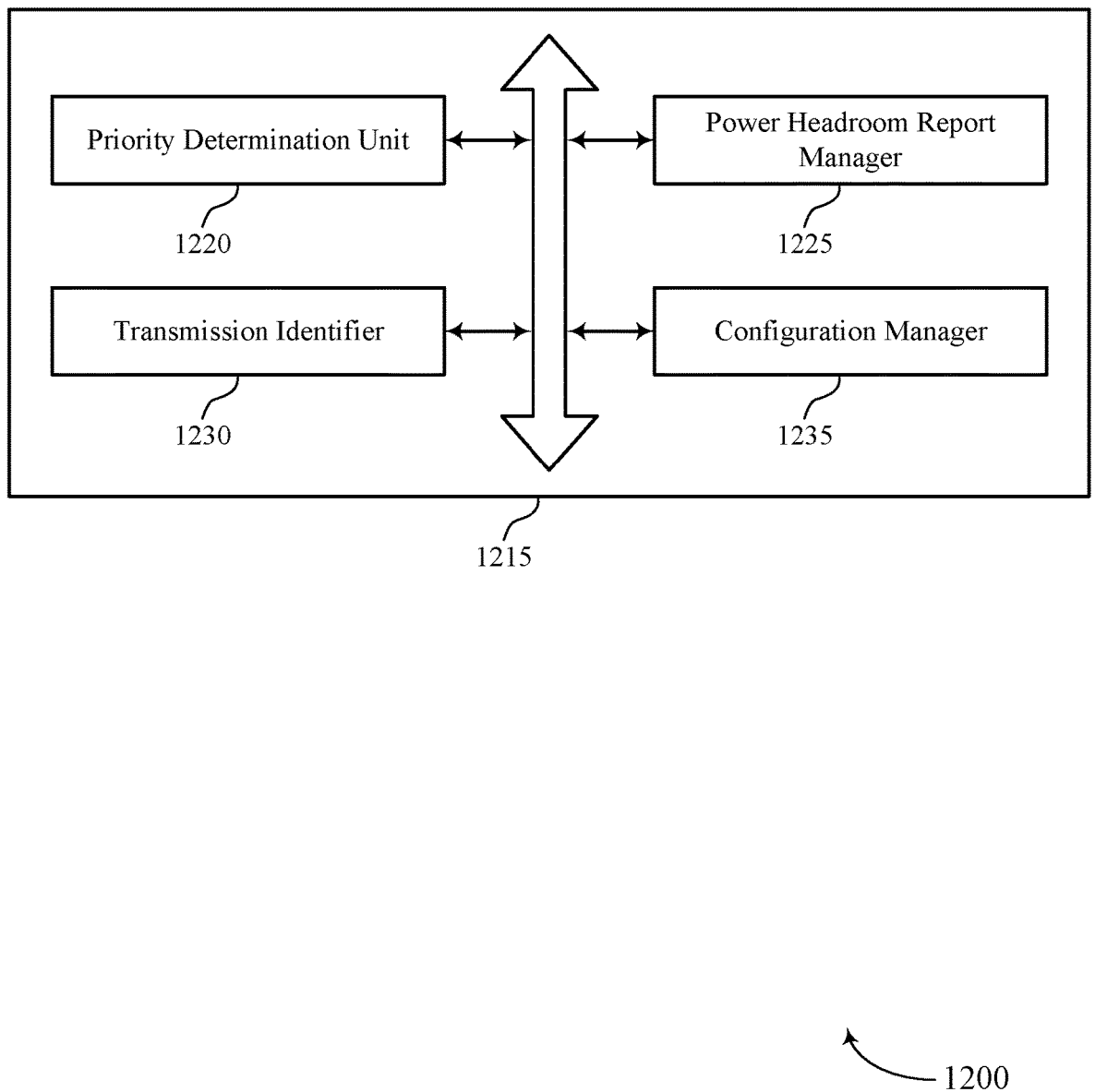

FIG. 12 shows a block diagram 1200 of a base station communications manager 1215 that supports coexistence of autonomous and grant based uplink transmissions in accordance with aspects of the present disclosure. The base station communications manager 1215 may be an example of aspects of a base station communications manager 1315 described with reference to FIGS. 10, 11, and 13. The base station communications manager 1215 may include priority determination unit 1220, power headroom report manager 1225, transmission identifier 1230, and configuration manager 1235. Each of these modules may communicate, directly or indirectly, with one another (e.g., via one or more buses).

Priority determination unit 1220 may identify a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period. In some cases, the priority configuration prioritizes the autonomous UL transmissions over the scheduled UL transmissions. In some cases, the priority configuration prioritizes the scheduled UL transmissions over the autonomous UL transmissions.

Power headroom report manager 1225 may receive a power headroom report from a UE on a first CC in a second RF spectrum band during a time period. In some cases, the power headroom report from the UE is received as at least a part of the received autonomous UL transmission. In some cases, the time period includes a subframe, or a slot, or a mini-slot, or a symbol, or a combination thereof.

Transmission identifier 1230 may identify, based on the received power headroom report, an indication of whether the UE will attempt to transmit an autonomous UL transmission on a second CC in a shared RF spectrum band.

Configuration manager 1235 may transmit, to the UE, a configuration for autonomous UL transmissions of the UE, where the autonomous UL transmission is received based on the transmitted configuration. In some cases, transmitting the configuration for autonomous UL transmissions includes: transmitting a RRC message that identifies the configuration or a default configuration for the power headroom report. In some cases, the configuration for autonomous UL transmissions includes frequency domain resources for the UE to use to transmit autonomous UL transmissions to the base station.

Figure 13:
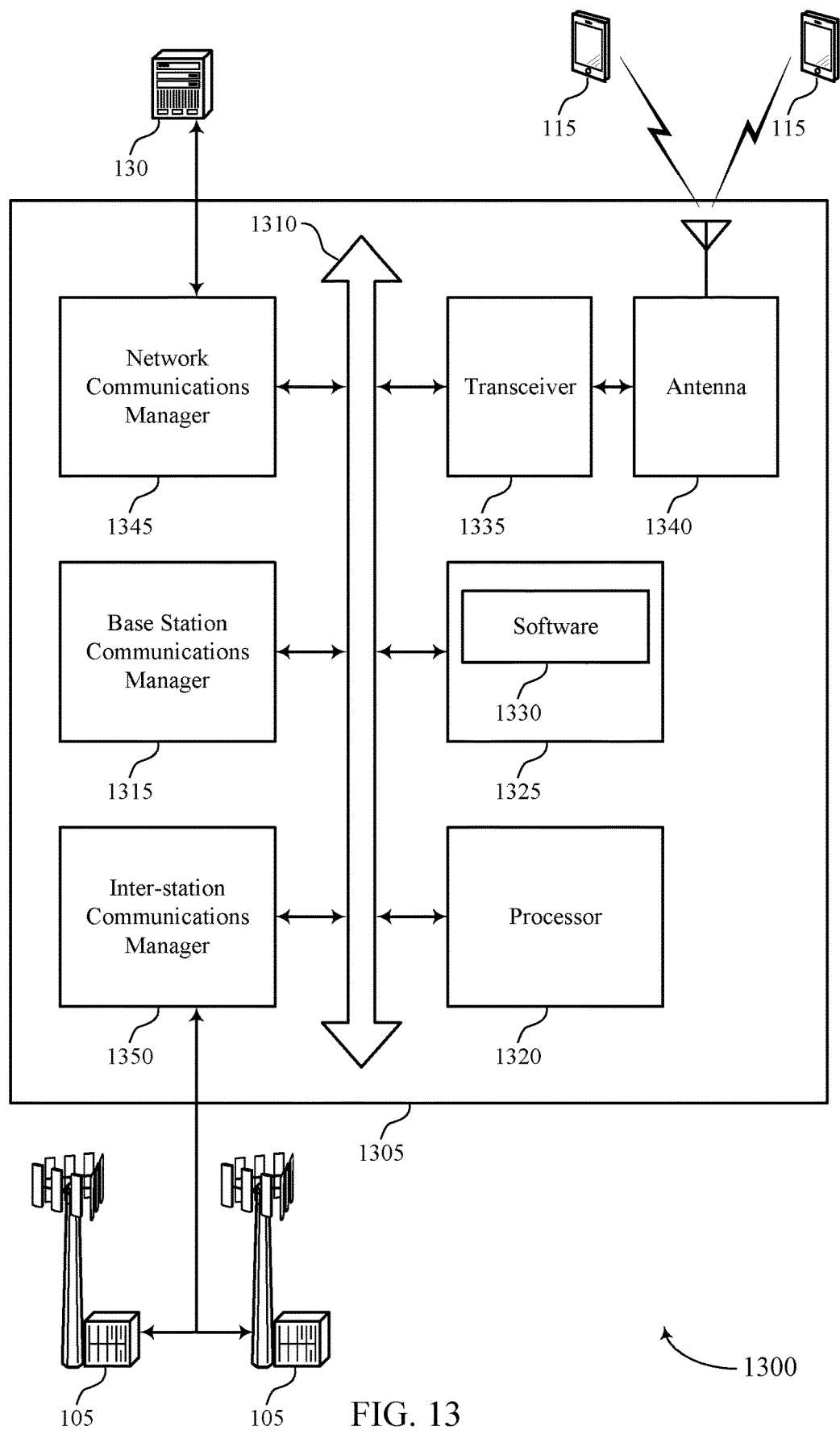
FIG. 13 illustrates a block diagram of a system including a base station that supports coexistence of autonomous and grant based uplink transmissions in accordance with aspects of the present disclosure.

FIG. 13 shows a diagram of a system 1300 including a device 1305 that supports coexistence of autonomous and grant based uplink transmissions in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting coexistence of autonomous and grant based uplink transmissions in multi-carrier licensed assisted access).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support coexistence of autonomous and grant based uplink transmissions in multi-carrier licensed assisted access. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
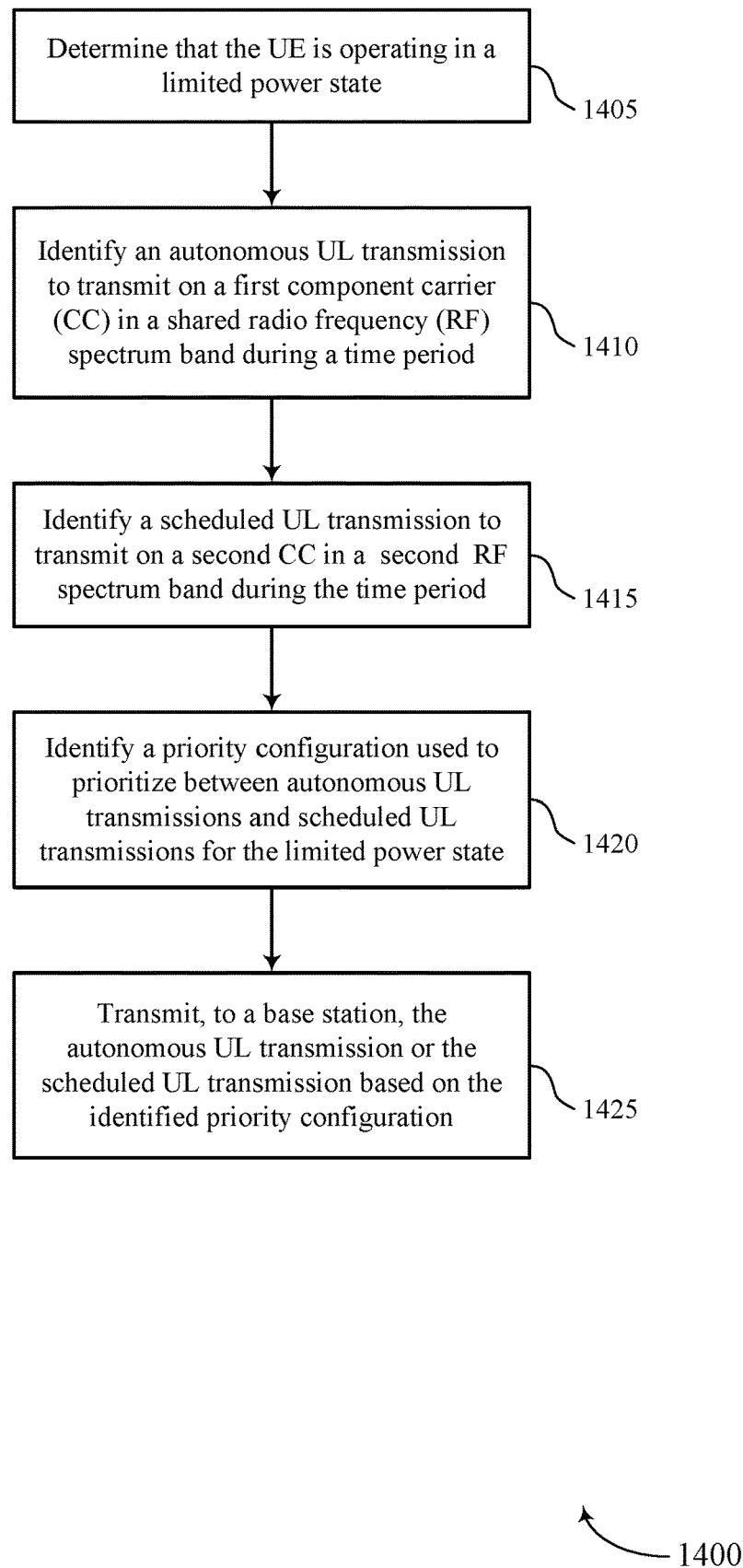
FIGS. 14 through 17 illustrate methods for coexistence of autonomous and grant based uplink transmissions in accordance with aspects of the present disclosure.

FIG. 14 shows a flowchart illustrating a method 1400 for coexistence of autonomous and grant based uplink transmissions in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may determine that the UE is operating in a limited power state. The operations of block 1405 may be performed according to the methods described herein. In certain examples, aspects of the operations of block 1405 may be performed by a power capacity unit as described with reference to FIGS. 6 through 9.

At block 1410 the UE 115 may identify an autonomous UL transmission to transmit on a first CC in a shared RF spectrum band during a time period. The operations of block 1410 may be performed according to the methods described herein. In certain examples, aspects of the operations of block 1410 may be performed by an autonomous UL identifier as described with reference to FIGS. 6 through 9.

At block 1415 the UE 115 may identify a scheduled UL transmission to transmit on a second CC in a second RF spectrum band during the time period. The operations of block 1415 may be performed according to the methods described herein. In certain examples, aspects of the operations of block 1415 may be performed by a scheduled UL identifier as described with reference to FIGS. 6 through 9.

At block 1420 the UE 115 may identify a priority configuration used to prioritize between autonomous UL transmissions and scheduled UL transmissions for the limited power state. The operations of block 1420 may be performed according to the methods described herein. In certain examples, aspects of the operations of block 1420 may be performed by a priority identifier as described with reference to FIGS. 6 through 9.

At block 1425 the UE 115 may transmit, to a base station, the autonomous UL transmission or the scheduled UL transmission based at least in part on the identified priority configuration. The operations of block 1425 may be performed according to the methods described herein. In certain examples, aspects of the operations of block 1425 may be performed by a transmission priority manager as described with reference to FIGS. 6 through 9.

Figure 15:
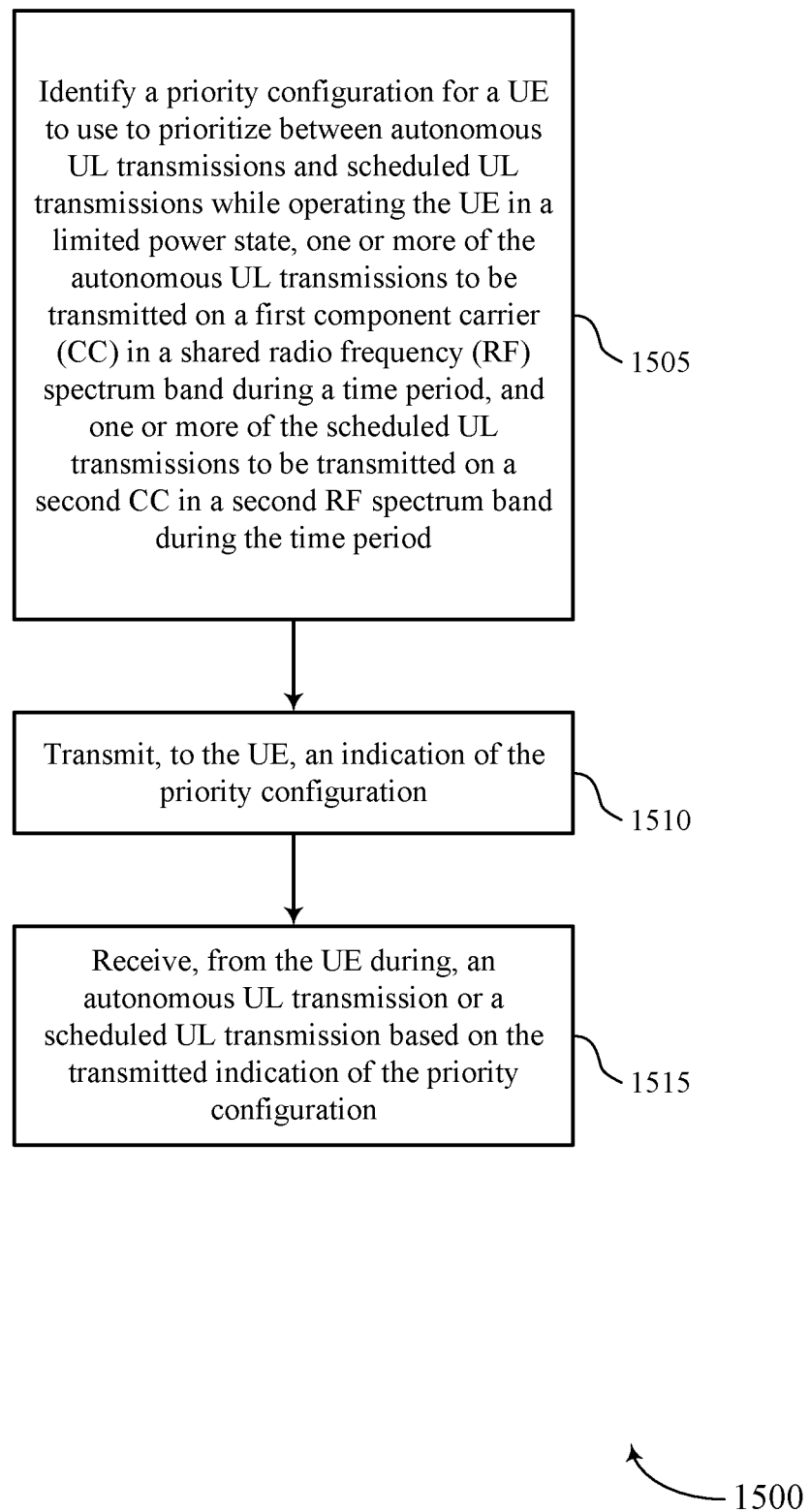

FIG. 15 shows a flowchart illustrating a method 1500 for coexistence of autonomous and grant based uplink transmissions in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a priority configuration for a UE to use to prioritize between autonomous UL transmissions and scheduled UL transmissions while operating the UE in a limited power state, one or more of the autonomous UL transmissions to be transmitted on a first CC in a shared RF spectrum band during a time period, and one or more of the scheduled UL transmissions to be transmitted on a second CC in a second RF spectrum band during the time period. The operations of block 1505 may be performed according to the methods described herein. In certain examples, aspects of the operations of block 1505 may be performed by a priority determination unit as described with reference to FIGS. 10 through 13.

At block 1510 the base station 105 may transmit, to the UE, an indication of the priority configuration. The operations of block 1510 may be performed according to the methods described herein. In certain examples, aspects of the operations of block 1510 may be performed by a transmitter as described with reference to FIGS. 10 through 13.

At block 1515 the base station 105 may receive, from the UE during, an autonomous UL transmission or a scheduled UL transmission based at least in part on the transmitted indication of the priority configuration. The operations of block 1515 may be performed according to the methods described herein. In certain examples, aspects of the operations of block 1515 may be performed by a receiver as described with reference to FIGS. 10 through 13.

Figure 16:
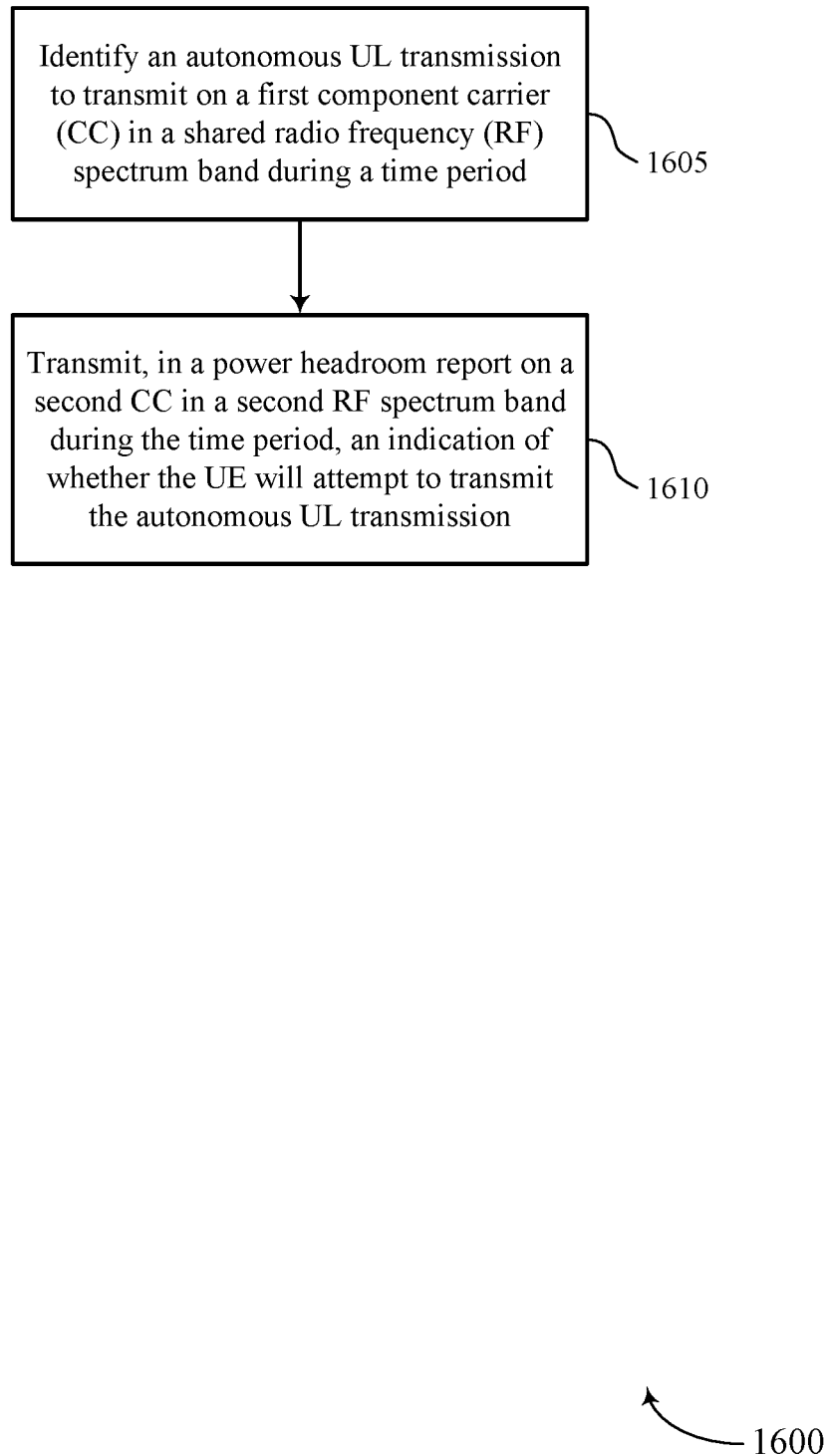

FIG. 16 shows a flowchart illustrating a method 1600 for coexistence of autonomous and grant based uplink transmissions in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify an autonomous UL transmission to transmit on a first CC in a shared RF spectrum band during a time period. The operations of block 1605 may be performed according to the methods described herein. In certain examples, aspects of the operations of block 1605 may be performed by an autonomous UL manager as described with reference to FIGS. 6 through 9.

At block 1610 the UE 115 may transmit, in a power headroom report on a second CC in a second RF spectrum band during the time period, an indication of whether the UE will attempt to transmit the autonomous UL transmission. The operations of block 1610 may be performed according to the methods described herein. In certain examples, aspects of the operations of block 1610 may be performed by a power headroom report configuration unit as described with reference to FIGS. 6 through 9.

Figure 17:
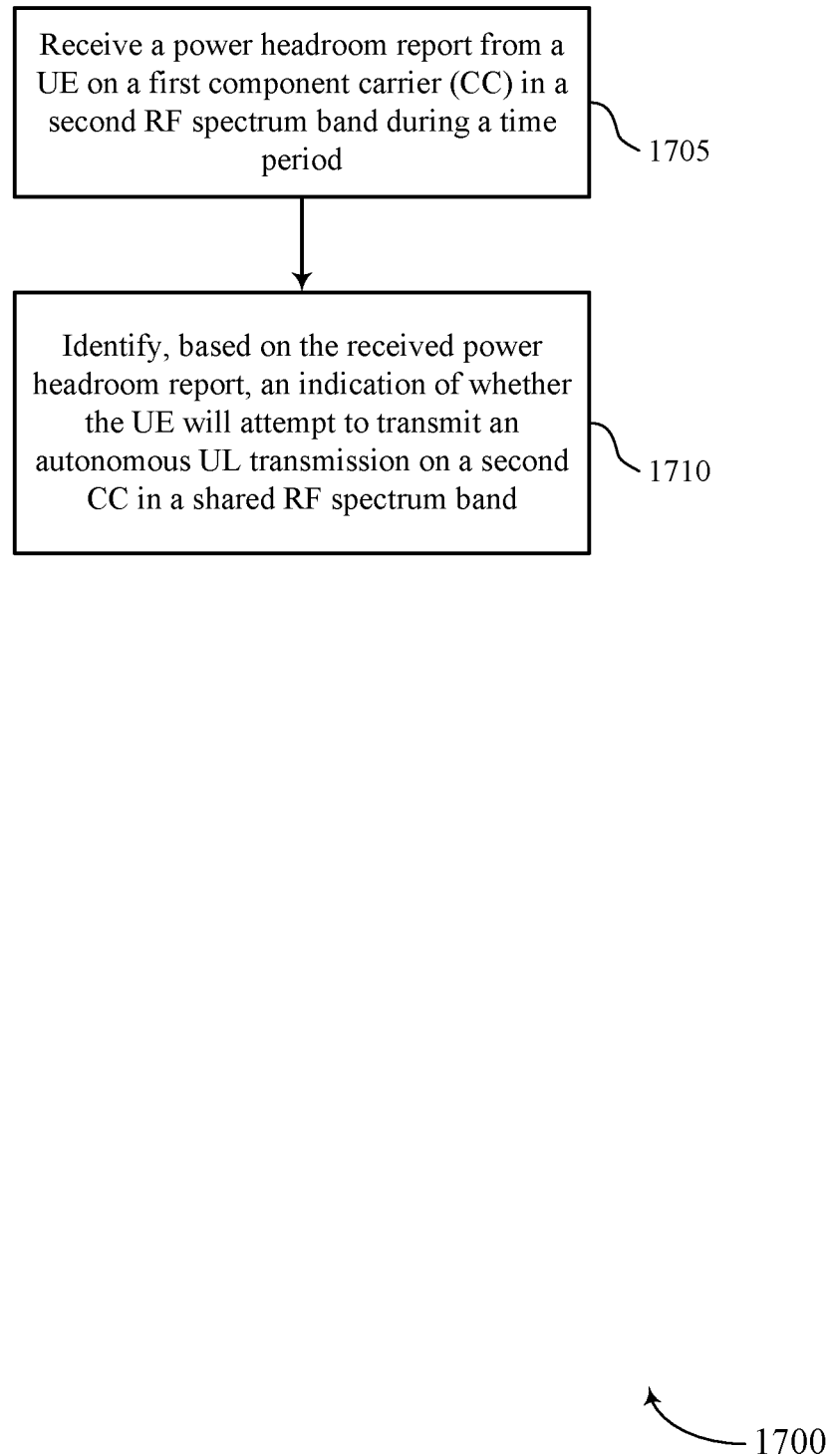

FIG. 17 shows a flowchart illustrating a method 1700 for coexistence of autonomous and grant based uplink transmissions in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive a power headroom report from a UE on a first CC in a second RF spectrum band during a time period. The operations of block 1705 may be performed according to the methods described herein. In certain examples, aspects of the operations of block 1705 may be performed by a power headroom report manager as described with reference to FIGS. 10 through 13.

At block 1710 the base station 105 may identify, based at least in part on the received power headroom report, an indication of whether the UE will attempt to transmit an autonomous UL transmission on a second CC in a shared RF spectrum band. The operations of block 1710 may be performed according to the methods described herein. In certain examples, aspects of the operations of block 1710 may be performed by a transmission identifier as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining that the UE is operating in a limited power state;
   identifying an autonomous uplink (UL) transmission to transmit on a first component carrier (CC) in a shared radio frequency (RF) spectrum band during a time period;
   identifying a scheduled UL transmission to transmit on a second CC in a second RF spectrum band during the time period;
   identifying a priority configuration used to prioritize between autonomous UL transmissions and scheduled UL transmissions for the limited power state, wherein the priority configuration prioritizes the scheduled UL transmission over the autonomous UL transmission; and
   transmitting, to a base station, the autonomous UL transmission or the scheduled UL transmission based at least in part on the identified priority configuration.

2. The method of claim 1, wherein:
   the second RF spectrum band is a scheduled RF spectrum band.

3. The method of claim 1, wherein:
   the second RF spectrum band is a shared RF spectrum band, or a licensed RF spectrum band, or an unlicensed RF spectrum band, or a combination thereof.

4. The method of claim 1, wherein identifying the priority configuration comprises:
   receiving the priority configuration from the base station.

5. The method of claim 1, wherein identifying the priority configuration comprises:
   identifying the priority configuration from a configuration stored at the UE.

6. The method of claim 1, further comprising:
   determining to forego transmitting the other one of the autonomous UL transmission or the scheduled UL transmission during the time period based at least in part on the identified priority configuration.

7. The method of claim 1, further comprising:
   dropping the other one of the autonomous UL transmission or the scheduled UL transmission based at least in part on the identified priority configuration.

8. The method of claim 1, further comprising:
   receiving a radio resource control (RRC) message from the base station, the RRC message indicating the priority configuration used to prioritize between the autonomous UL transmissions and the scheduled UL transmissions.

9. The method of claim 1, wherein:
   the time period comprises a subframe, or a slot, or a mini-slot, or a symbol, or a combination thereof.

10. The method of claim 1, wherein:
    the limited power state comprises a reduced power mode.

11. The method of claim 1, wherein determining that the UE is operating in the limited power state comprises:
    determining that an operating power level of the UE would exceed a power threshold for the UE.

12. A method for wireless communication at a base station, comprising:
    identifying a priority configuration for a user equipment (UE) to use to prioritize between autonomous uplink (UL) transmissions and scheduled UL transmissions while operating the UE in a limited power state, one or more of the autonomous UL transmissions to be transmitted on a first component carrier (CC) in a shared radio frequency (RF) spectrum band during a time period, and one or more of the scheduled UL transmissions to be transmitted on a second CC in a second RF spectrum band during the time period;
    transmitting, to the UE, an indication of the priority configuration, wherein the priority configuration prioritizes the scheduled UL transmissions over the autonomous UL transmissions; and
    receiving, from the UE during the time period, an autonomous UL transmission or a scheduled UL transmission based at least in part on the transmitted indication of the priority configuration.

13. The method of claim 12, wherein transmitting the indication of the priority configuration comprises:
    transmitting a radio resource control (RRC) message to the UE, the RRC message indicating the priority configuration.

14. A method for wireless communication at a user equipment (UE), comprising:
    receiving, from a base station, a configuration for autonomous uplink (UL) transmissions of the UE;
    identifying an autonomous UL transmission to transmit on a first component carrier (CC) in a shared radio frequency (RF) spectrum band during a time period; and
    transmitting, in a power headroom report on a second CC in a second RF spectrum band during the time period, an indication of whether the UE will attempt to transmit the autonomous UL transmission, wherein the indication of whether the UE will attempt to transmit the autonomous UL transmission is transmitted based at least in part on the received configuration.

15. The method of claim 14, further comprising:
    transmitting a scheduled UL transmission on the second CC in the second RF spectrum band during the time period, the scheduled UL transmission including the power headroom report.

16. The method of claim 14, further comprising:
    attempting to transmit the identified autonomous UL transmission on the first CC in the shared RF spectrum band during the time period.

17. The method of claim 14, wherein:
    the time period comprises a subframe, or a slot, or a mini-slot, or a symbol, or a combination thereof.

18. The method of claim 14, further comprising:
    receiving a scheduled UL transmission on the first CC in the second RF spectrum band during the time period, the scheduled UL transmission including the power headroom report.

19. A method for wireless communication at a base station, comprising:
    transmitting, to a user equipment (UE), a configuration for autonomous uplink (UL) transmissions of the UE;
    receiving a power headroom report from the UE on a first component carrier (CC) in a second RF spectrum band during a time period; and
    identifying, based at least in part on the received power headroom report, an indication of whether the UE will attempt to transmit an autonomous UL transmission on a second CC in a shared RF spectrum band, wherein identifying the indication of whether the UE will attempt to transmit the autonomous UL transmission is based at least in part on the transmitted configuration.

20. The method of claim 19, further comprising:
receiving, during at least a portion of the time period, the autonomous UL transmission on the second CC in the shared RF spectrum band.

21. The method of claim 20, wherein:
the power headroom report from the UE is received as at least a part of the received autonomous UL transmission.

22. The method of claim 20, wherein the autonomous UL transmission is received based at least in part on the transmitted configuration.

23. The method of claim 22, wherein transmitting the configuration for autonomous UL transmissions comprises:
transmitting a radio resource control (RRC) message that identifies the configuration or a default configuration for the power headroom report.

24. The method of claim 22, wherein:
the configuration for autonomous UL transmissions comprises frequency domain resources for the UE to use to transmit autonomous UL transmissions to the base station.

25. The method of claim 19, wherein:
the time period comprises a subframe, or a slot, or a mini-slot, or a symbol, or a combination thereof.

* * * * *